US012283411B2

(12) United States Patent
Takanezawa et al.

(10) Patent No.: US 12,283,411 B2
(45) **Date of Patent: *Apr. 22, 2025**

(54) METHOD FOR CRYSTALLIZATION HEAT TREATING A STACK OF AMORPHOUS ALLOY RIBBONS

(71) Applicant: TOYOTA JIDOSHA KABUSHIKI KAISHA, Toyota (JP)

(72) Inventors: Yu Takanezawa, Nissin (JP); Tomohiro Takao, Toyota (JP); Hideki Manabe, Toyota (JP); Shinichi Hiramatsu, Okazaki (JP); Kensuke Komori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1119 days.

This patent is subject to a terminal disclaimer.

(21) Appl. No.: 16/725,028

(22) Filed: Dec. 23, 2019

(65) Prior Publication Data

US 2020/0224286 A1 Jul. 16, 2020

(30) Foreign Application Priority Data

Jan. 10, 2019 (JP) ................................ 2019-002952

(51) Int. Cl.
*H01F 41/02* (2006.01)
*C22C 45/02* (2006.01)
(Continued)

(52) U.S. Cl.
CPC ............ *H01F 27/25* (2013.01); *C22C 45/02* (2013.01); *H01F 1/15333* (2013.01); *H01F 41/0226* (2013.01); *C21D 2201/03* (2013.01)

(58) Field of Classification Search
None
See application file for complete search history.

(56) References Cited

U.S. PATENT DOCUMENTS 4,529,457 A 7/1985 Kushnick
4,705,578 A * 11/1987 Lin .................... H01F 41/0226 148/108

(Continued)

FOREIGN PATENT DOCUMENTS

CN 102741957 A 10/2012
CN 102868241 A 1/2013

(Continued)

OTHER PUBLICATIONS

JP H07-278764 machine translation (Year: 1995).*

(Continued)

*Primary Examiner* — Paul A Wartalowicz
*Assistant Examiner* — Stephani Hill
(74) *Attorney, Agent, or Firm* — Sughrue Mion, PLLC

(57) ABSTRACT

After a first heat treatment step, an ambient temperature of a stack is held so that the stack is kept in a temperature range that allows the stack to be crystallized by heating the end of the stack to a second temperature range in the second heat treatment step; and a following expression (1) is satisfied, where Q1 represents an amount of heat required to heat the stack to the first temperature range in the first heat treatment step, Q2 represents an amount of heat that is applied to the stack when heating the end of the stack to the second temperature range in the second heat treatment step, Q3 represents an amount of heat that is released during crystallization of the stack, and Q4 represents an amount of heat required to heat the entire stack to the crystallization start temperature $$Q1+Q2+Q3>Q4 \quad (1).$$

5 Claims, 21 Drawing Sheets

(51) Int. Cl.
*H01F 1/153* (2006.01)
*H01F 27/25* (2006.01)

(56) References Cited

U.S. PATENT DOCUMENTS

| | | | |
|---|---|---|---|
| 4,832,763 A | 5/1989 | Rauch et al. | |
| 4,835,292 A | 5/1989 | Senda et al. | |
| 2008/0089708 A1* | 4/2008 | Gross | G03G 15/5041 399/49 |
| 2010/0018610 A1 | 1/2010 | Petzold et al. | |
| 2013/0000795 A1 | 1/2013 | Nakanoue | |
| 2017/0229237 A1 | 8/2017 | Makino et al. | |
| 2019/0173329 A1 | 6/2019 | Nishikawa et al. | |
| 2020/0251279 A1 | 8/2020 | Takanezawa et al. | |

FOREIGN PATENT DOCUMENTS

| | | | | |
|---|---|---|---|---|
| CN | 103258612 A | | 8/2013 | |
| EP | 3 522 186 A1 | | 8/2019 | |
| JP | 07278764 A | * | 10/1995 | H01F 1/15308 |
| JP | 09017623 A | * | 1/1997 | H01F 1/15333 |
| JP | 2011165701 A | | 8/2011 | |
| JP | 2013118348 A | * | 6/2013 | |
| JP | 2016-197646 A | | 11/2016 | |
| JP | 2017141508 A | | 8/2017 | |
| JP | 2020-117746 A | | 8/2020 | |
| JP | 2021-075752 A | | 5/2021 | |
| KR | 10-1459700 B1 | | 11/2014 | |
| WO | 2018/062310 A1 | | 4/2018 | |

OTHER PUBLICATIONS

JP H09-017623 machine translation (Year: 1997).*

JP 2013-118348 machine translation (Year: 2013).*

Office Action issued Jul. 15, 2022 in U.S. Appl. No. 16/782,860.

U.S. Appl. No. 16/782,860, filed Feb. 5, 2020 (Takanezawa et al.).

Office Action Issued to U.S. Appl. No. 16/782,860 on May 25, 2021.

Communication dated Sep. 1, 2021, from the United States Patent and Trademark Office in U.S. Appl. No. 16/782,860.

Office Action dated Apr. 26, 2022 issued in U.S. Appl. No. 16/782,860.

Notice of Allowance dated Oct. 18, 2022 issued in U.S. Appl. No. 16/782,860.

* cited by examiner

100

METHOD FOR CRYSTALLIZATION HEAT TREATING A STACK OF AMORPHOUS ALLOY RIBBONS

INCORPORATION BY REFERENCE

The disclosure of Japanese Patent Application No. 2019-002952 filed on Jan. 10, 2019 including the specification, drawings and abstract is incorporated herein by reference in its entirety.

BACKGROUND

1. Technical Field

The disclosure relates to methods for producing an alloy ribbon that is a crystallized amorphous alloy ribbon.

2. Description of Related Art

Since amorphous alloy ribbons are a soft magnetic material, stacks of amorphous alloy ribbons are used as cores in motors, transformers, etc. Amorphous alloy ribbons are crystallized into nanocrystalline alloy ribbons when heated. Such nanocrystalline alloy ribbons are a soft magnetic material that can have both a high saturation magnetic flux density and low coercivity. Accordingly, stacks of nanocrystalline alloy ribbons have been recently used as such cores.

When amorphous alloy ribbons are crystallized into nanocrystalline alloy ribbons, heat is released by the crystallization reaction. Accordingly, the temperature may rise excessively. As a result, grain coarsening or precipitation of compound phases may occur, which may degrade soft magnetic properties.

As a solution to the above issue, amorphous alloy ribbons may be independently heated and crystallized one by one. This method improves heat dissipation properties and reduces the influence of a temperature rise due to the heat released by the crystallization reaction. However, this method is less productive because the amorphous alloy ribbons are heat-treated one by one.

For example, Japanese Unexamined Patent Application Publication No. 2017-141508 (JP 2017-141508 A) describes a method in which a stack of amorphous alloy ribbons are sandwiched between plates from its both ends in the stacking direction, and the stack is crystallized by heating the stack from its both ends by plates. JP 2017-141508 A proposes to cause heat released by the crystallization reaction to be absorbed by the plates at both ends of the stack in order to restrain a temperature rise.

Japanese Unexamined Patent Application Publication No. 2011-165701 (JP 2011-165701 A) describes a method in which a stack having a heater sandwiched between adjacent ones of amorphous alloy ribbons is heated in order to adjust the temperature distribution within the stack during heating.

SUMMARY

In the method proposed in JP 2017-141508 A, the reaction heat of the plurality of alloy ribbons is absorbed by the plates from both ends of the stack in the stacking direction. The thickness (the number of alloy ribbons) of the stack is therefore limited to such a thickness that the heat can be absorbed by the plates. Since the number of alloy ribbons that can be crystallized by heating a single stack is limited, crystallized alloy ribbons cannot be produced with high productivity. The same applies to the method proposed in JP 2011-165701 A.

An aspect of the disclosure provides a method for producing an alloy ribbon by which alloy ribbons, which are crystallized amorphous alloy ribbons, are produced with high productivity.

The method for producing an alloy ribbon according to the aspect of the disclosure includes: a preparation step of preparing a stack of a plurality of amorphous alloy ribbons; a first heat treatment step of heating the stack to a first temperature range lower than a crystallization start temperature of the amorphous alloy ribbons; and a second heat treatment step of heating an end of the stack to a second temperature range equal to or higher than the crystallization start temperature after the first heat treatment step. After the first heat treatment step, an ambient temperature of the stack is held so that the stack is kept in a temperature range that allows the stack to be crystallized by heating the end of the stack to the second temperature range in the second heat treatment step. A following expression (1) is satisfied, where Q1 represents an amount of heat required to heat the stack to the first temperature range in the first heat treatment step, Q2 represents an amount of heat that is applied to the stack when heating the end of the stack to the second temperature range in the second heat treatment step, Q3 represents an amount of heat that is released during crystallization of the stack, and Q4 represents an amount of heat required to heat the entire stack to the crystallization start temperature.

$$Q1+Q2+Q3\geq Q4 \qquad (1)$$

According to the aspect of the disclosure, alloy ribbons, which are crystallized amorphous alloy ribbons, are produced with high productivity.

In the method for producing an alloy ribbon according to the above aspect, the end of the stack which is heated in the second heat treatment step may be an end of the stack in a stacking direction.

In the method for producing an alloy ribbon according to the above aspect, in the second heat treatment step, the end of the stack in the stacking direction may be heated with the stack being pressed in the stacking direction.

In the method for producing an alloy ribbon according to the above aspect, the end of the stack which is heated in the second heat treatment step may be an end of the stack in a planar direction.

The method for producing an alloy ribbon according to the above aspect may further include a heat dissipation step of placing a heat dissipating member in contact with an opposite end of the stack from the end.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a method for producing an alloy ribbon according to the present disclosure will be described below.

The method for producing an alloy ribbon according to the embodiment includes: a preparation step of preparing a stack of a plurality of amorphous alloy ribbons; a first heat treatment step of heating the stack to a first temperature range lower than a crystallization start temperature of the amorphous alloy ribbons; and a second heat treatment step of heating an end of the stack to a second temperature range equal to or higher than the crystallization start temperature after the first heat treatment step. After the first heat treatment step, the ambient temperature of the stack is held so that the stack is kept in such a temperature range that allows the stack to be crystallized by heating the end of the stack to the second temperature range in the second heat treatment step. The following expression (1) is satisfied, where Q1 represents the amount of heat required to heat the stack to the first temperature range in the first heat treatment step, Q2 represents the amount of heat that is applied to the stack when heating the end of the stack to the second temperature range in the second heat treatment step, Q3 represents the amount of heat that is released during crystallization of the stack, and Q4 represents the amount of heat required to heat the entire stack to the crystallization start temperature.

$$Q1+Q2+Q3 \geq Q4 \quad (1)$$

Figure 1A:
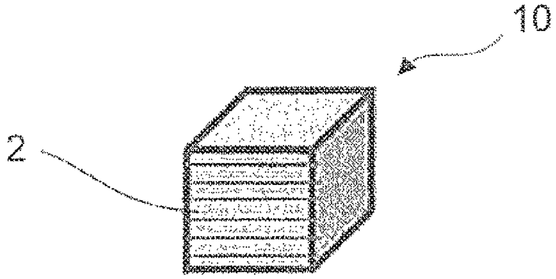
FIG. 1A is a schematic process diagram illustrating an example of a method for producing an alloy ribbon according to an embodiment of the disclosure.
Figure 1B:
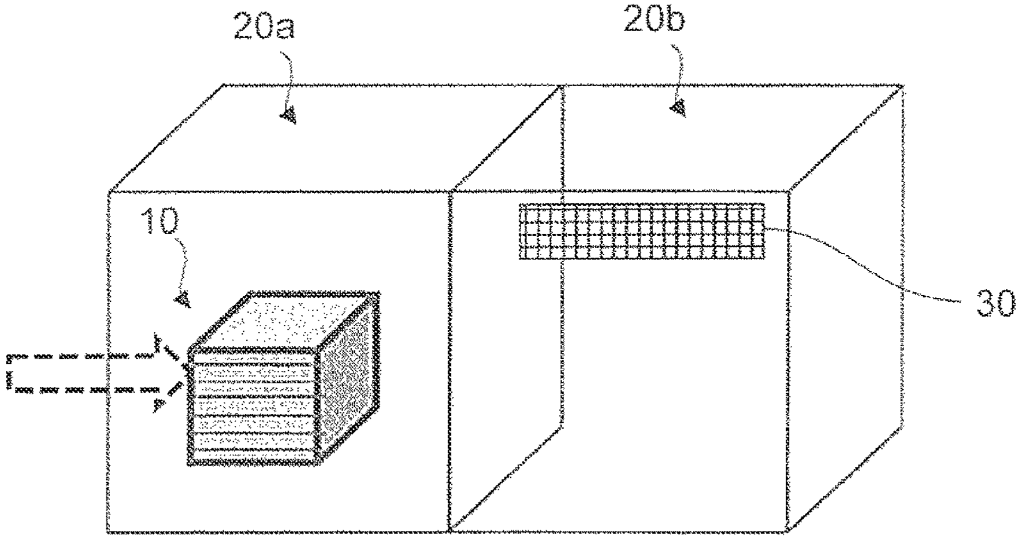
FIG. 1B is a schematic process diagram illustrating the example of the method for producing an alloy ribbon according to the embodiment of the disclosure.
Figure 1C:
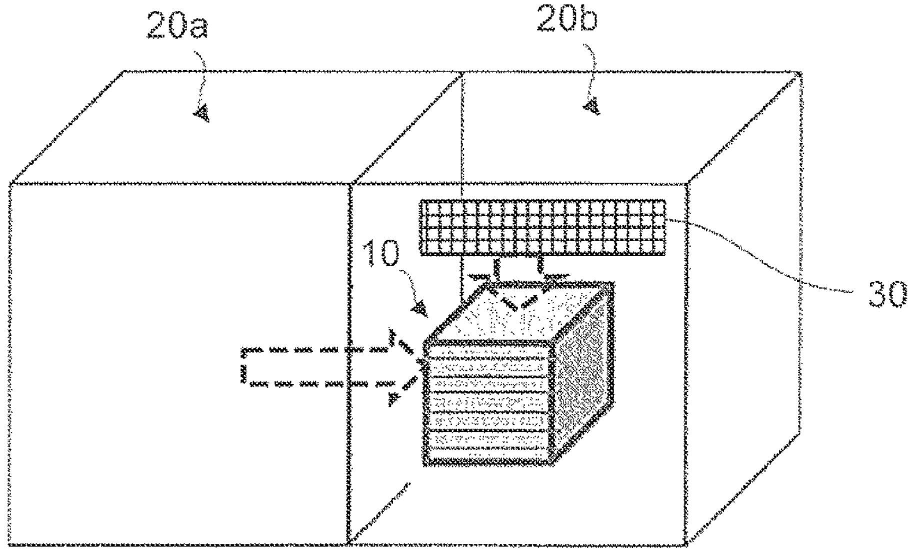
FIG. 1C is a schematic process diagram illustrating the example of the method for producing an alloy ribbon according to the embodiment of the disclosure.
Figure 2:
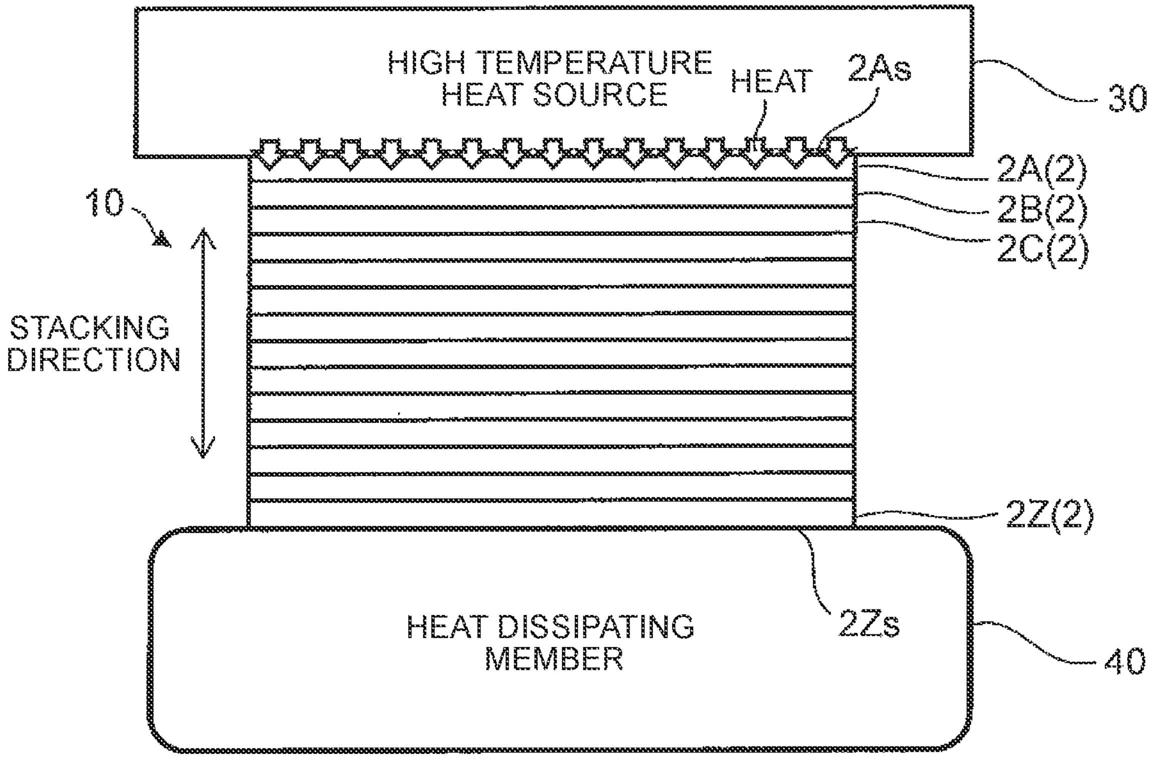
FIG. 2 is a schematic diagram illustrating a second heat treatment step shown in FIG. 1C.
Figure 3A:
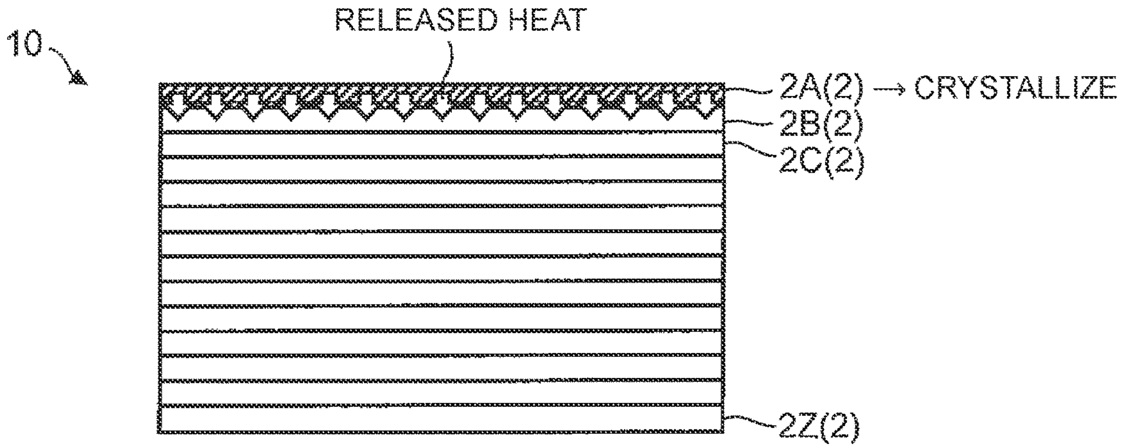
FIG. 3A is a schematic diagram illustrating how a crystallization reaction is caused by the second heat treatment step shown in FIG. 1C.
Figure 3B:
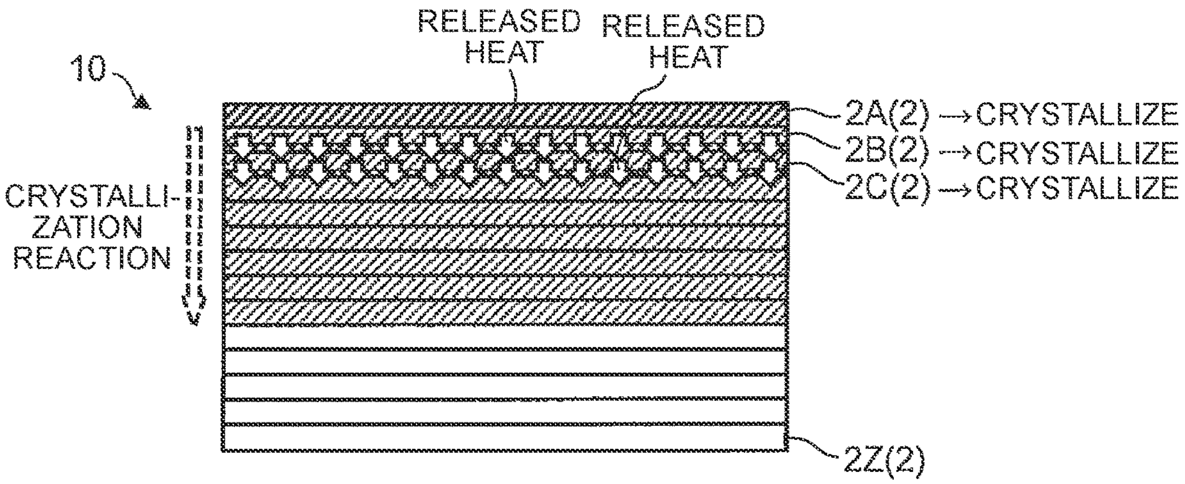
FIG. 3B is a schematic diagram illustrating how the crystallization reaction is caused by the second heat treatment step shown in FIG. 1C.
Figure 4:
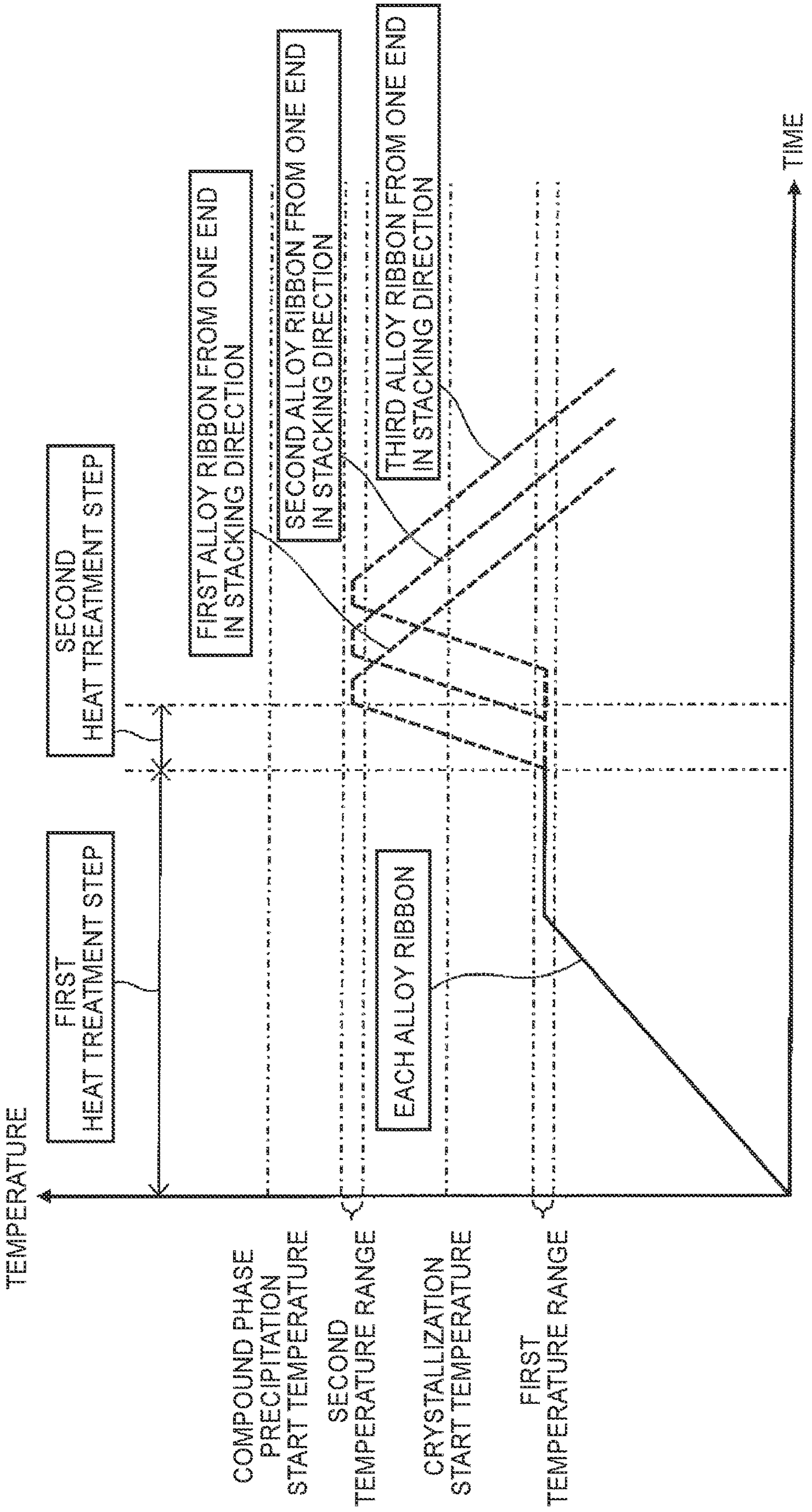
FIG. 4 is a graph schematically showing the temperature profile of each amorphous alloy ribbon of a stack in the method for producing an alloy ribbon shown in FIGS. 1A to 1C.
Figure 5:
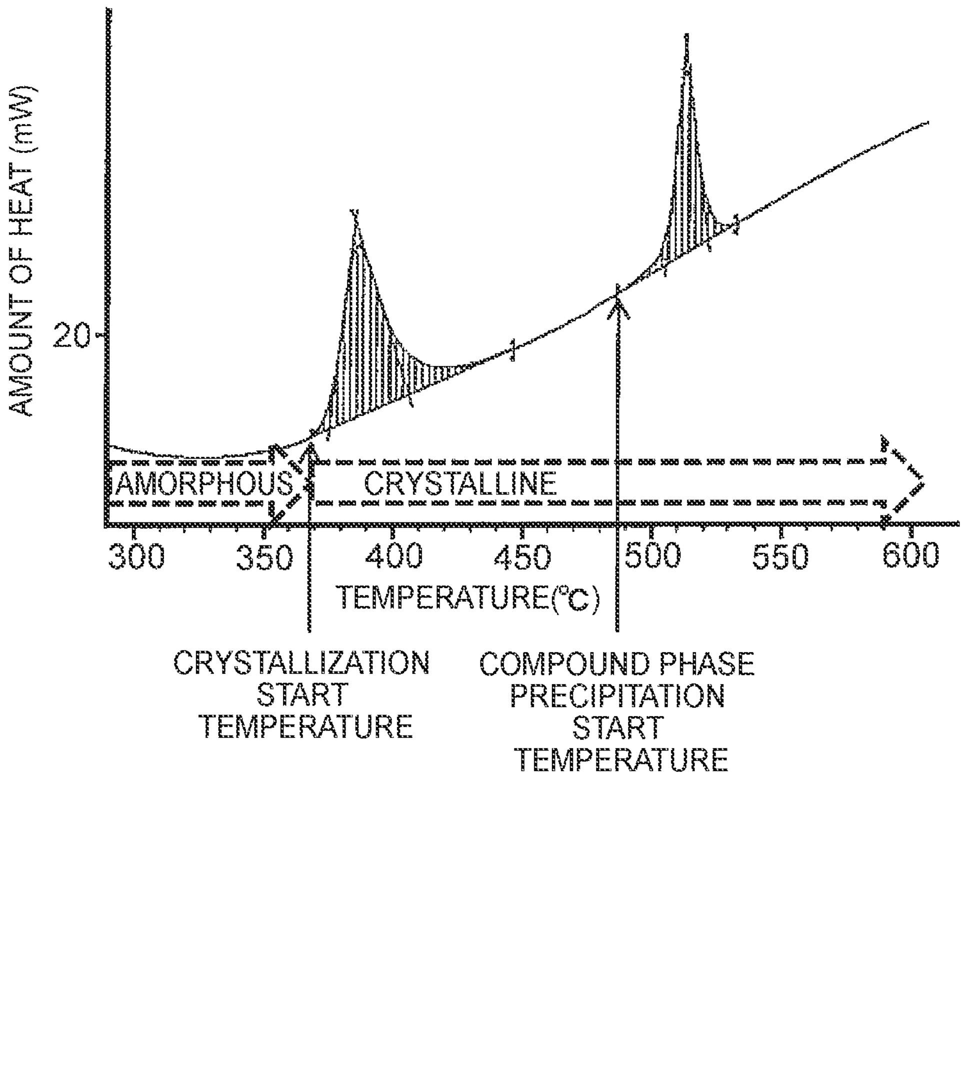
FIG. 5 is a graph showing a DSC curve of an amorphous alloy measured with a differential scanning calorimeter (DSC)

First, the method for producing an alloy ribbon according to the embodiment will be described. FIGS. 1A to 1C are schematic process diagrams illustrating an example of the method for producing an alloy ribbon according to the embodiment. FIG. 2 is a schematic diagram illustrating the second heat treatment step shown in FIG. 1C. FIGS. 3A and 3B are schematic diagrams illustrating how a crystallization reaction is caused by the second heat treatment step shown in FIG. 1C. FIG. 4 is a graph schematically showing the temperature profile of each amorphous alloy ribbon of the stack in the method for producing an alloy ribbon show in FIGS. 1A to 1C. The graph of FIG. 4 partially shows the temperature profiles at the central positions of the alloy ribbons including the first, second, and third alloy ribbons from one end of the stack in the stacking direction. FIG. 5 is a graph showing a DSC curve of an amorphous alloy measured with a differential scanning calorimeter (DSC).

In the method for producing an alloy ribbon according to this example, a stack 10 of a plurality of amorphous alloy ribbons 2 is first prepared as shown in FIG. 1A (preparation step).

Next, as shown in FIG. 1B, the stack 10 is moved into a first heating furnace 20*a* and heated to the first temperature range lower than the crystallization start temperature of the amorphous alloy ribbons 2 in the first heating furnace 20*a* (first heat treatment step). Specifically, as shown by, e.g., the temperature profiles of FIG. 4, the entire stack 10 is soaked so that the overall temperature of all the amorphous alloy ribbons 2 of the stack 10 is within the first temperature range.

Then, as shown in FIGS. 1C and 2, the stack 10 is moved into a second heating furnace 20*b*, where a surface 2As of the first amorphous alloy ribbon 2A from the one end of the stack 10 in the stacking direction is in contact with a high temperature heat source 30 for a short time. As shown in the temperature profiles of FIG. 4, the entire first amorphous alloy ribbon 2A is heated to the second temperature range equal to or higher than the crystallization start temperature while the part of the stack 10 other than the first amorphous alloy ribbon 2A is kept in the temperature range lower than the crystallization start temperature (second heat treatment step). Subsequently, a heat dissipating member 40 is placed in contact with a surface 2Zs of the amorphous alloy ribbon 2Z located at the opposite end in the stacking direction of the stack 10 from the first amorphous alloy ribbon 2A (heat dissipation step). Dissipating heat from the surface 2Zs restrains heat accumulation in a part of the stack 10 which is close to the surface 2Zs of the amorphous alloy ribbon 2Z due to the heat released by the crystallization reaction and thus restrains grain coarsening and precipitation of compound phases.

In this example, after the first heat treatment step, the ambient temperature of the stack 10 is held so that the entire stack 10 is kept in such a temperature range that the stack 10 can be crystallized by heating the entire first amorphous alloy ribbon 2A to the second temperature range in the second heat treatment step. In other words, after the first heat treatment step, the ambient temperature of the stack 10 is held so that the entire stack 10 is kept in such a temperature range that crystallization of the entire stack 10 can occur by heating the entire first amorphous alloy ribbon 2A to the second temperature range in the second heat treatment step.

The following expression (1) is satisfied, where Q1 represents the amount of heat required to heat the entire stack 10 to the first temperature range in the first heat treatment step, Q2 represents the amount of heat that is applied to the stack 10 when heating the first amorphous alloy ribbon 2A to the second temperature range in the second heat treatment step, Q3 represents the amount of heat that is released during crystallization of the stack 10, and Q4 represents the amount of heat required to heat the entire stack 10 to the crystallization start temperature.

$$Q1+Q2+Q3 \geq Q4 \quad (1)$$

In this example, the first amorphous alloy ribbon 2A of the stack 10 is heated to the second temperature range equal to or higher than the crystallization start temperature in the second heat treatment step. The first amorphous alloy ribbon 2A is thus crystallized as shown in FIG. 3A. As can be seen from the DSC curve of FIG. 5, the first amorphous alloy ribbon 2A releases heat due to the crystallization reaction. The heat thus released transfers from the first amorphous alloy ribbon 2A having a high temperature after the crystallization reaction to the second amorphous alloy ribbon 2B from the one end which has a low temperature.

Since the ambient temperature of the stack 10 is held as described above and the expression (1) is satisfied, the second amorphous alloy ribbon 2B is heated mainly by the released heat to the second temperature range, as shown by the temperature profile of FIG. 4. The second amorphous alloy ribbon 2B is thus crystallized and releases heat due to the crystallization reaction, as shown in FIG. 3B. Similarly, the third amorphous alloy ribbon 2C from the one end is heated mainly by the heat released from the second amorphous alloy ribbon 2B to the second temperature range, as shown by the temperature profile of FIG. 4. The third amorphous alloy ribbon 2C is thus crystallized and releases heat due to the crystallization reaction, as shown in FIG. 3B.

As shown in FIG. 3B, such a crystallization reaction and heat release due to the crystallization reaction repeatedly occur so as to propagate from the first amorphous alloy ribbon 2A located at the one end of the stack 10 in the stacking direction to the amorphous alloy ribbon 2Z located at the other end of the stack 10 in the stacking direction. All the amorphous alloy ribbons 2 of the stack 10 are thus entirely crystallized by merely heating the stack 10 to the first temperature range in the first heat treatment step and then heating the first amorphous alloy ribbon 2A to the second temperature range in the second heat treatment step. The thickness (the number of amorphous alloy ribbons 2) of the stack 10 is not particularly limited.

Figure 6A:
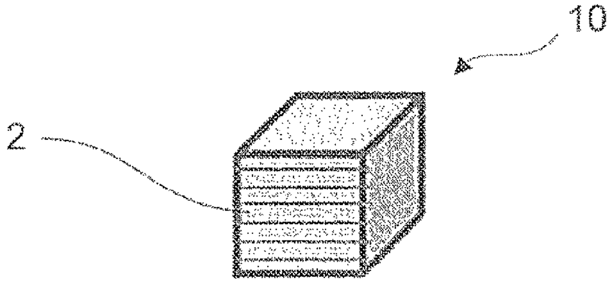
FIG. 6A is a schematic process diagram illustrating another example of the method for producing an alloy ribbon according to the embodiment of the disclosure.
Figure 6B:
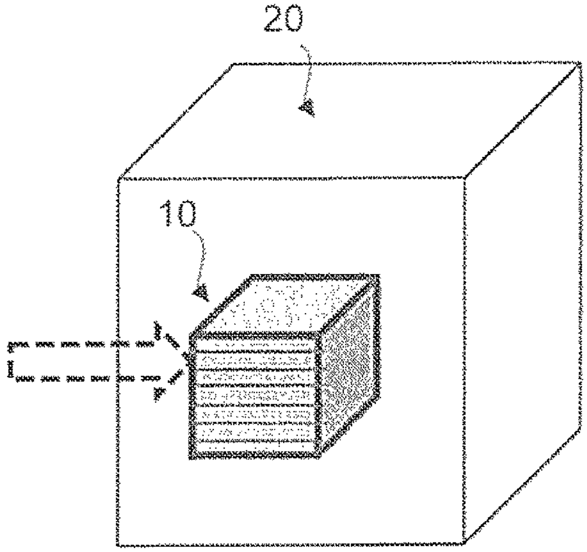
FIG. 6B is a schematic process diagram illustrating the another example of the method for producing an alloy ribbon according to the embodiment of the disclosure.
Figure 6C:
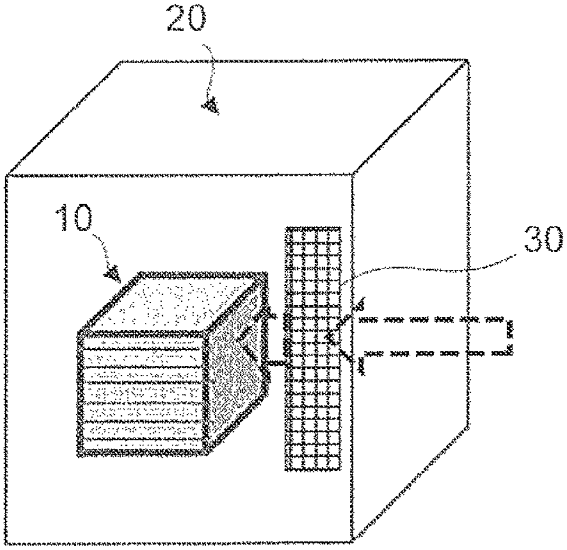
FIG. 6C is a schematic process diagram illustrating the another example of the method for producing an alloy ribbon according to the embodiment of the disclosure.
Figure 7:
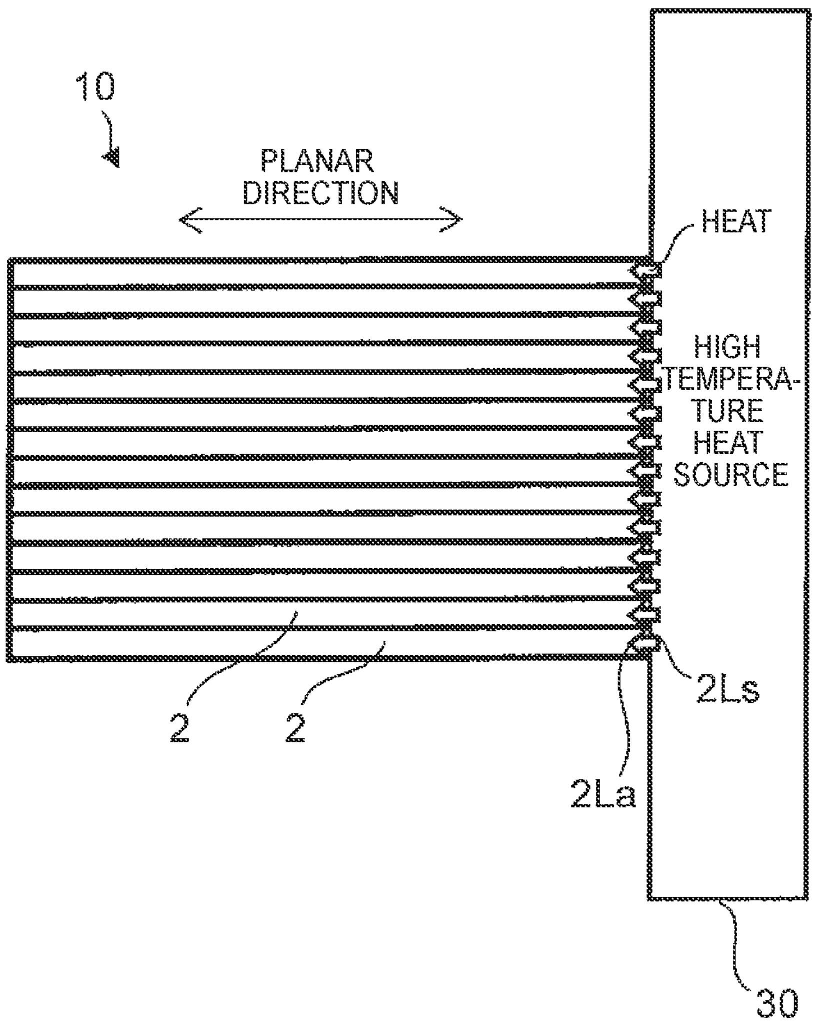
FIG. 7 is a schematic diagram illustrating a second heat treatment step shown in FIG. 6C.
Figure 8A:
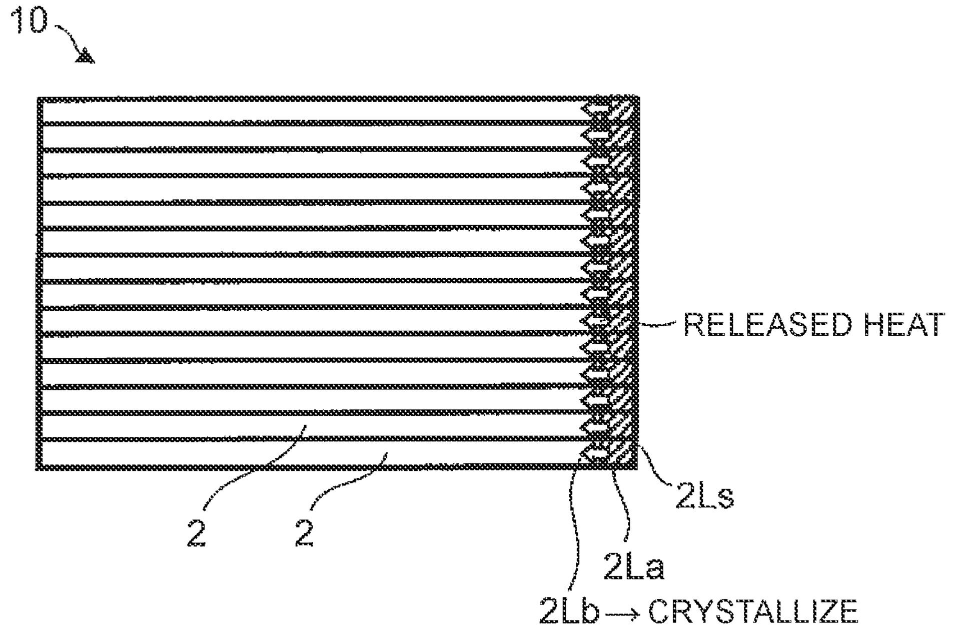
FIG. 8A is a schematic diagram illustrating how a crystallization reaction is caused by the second heat treatment step shown in FIG. 6C.
Figure 8B:
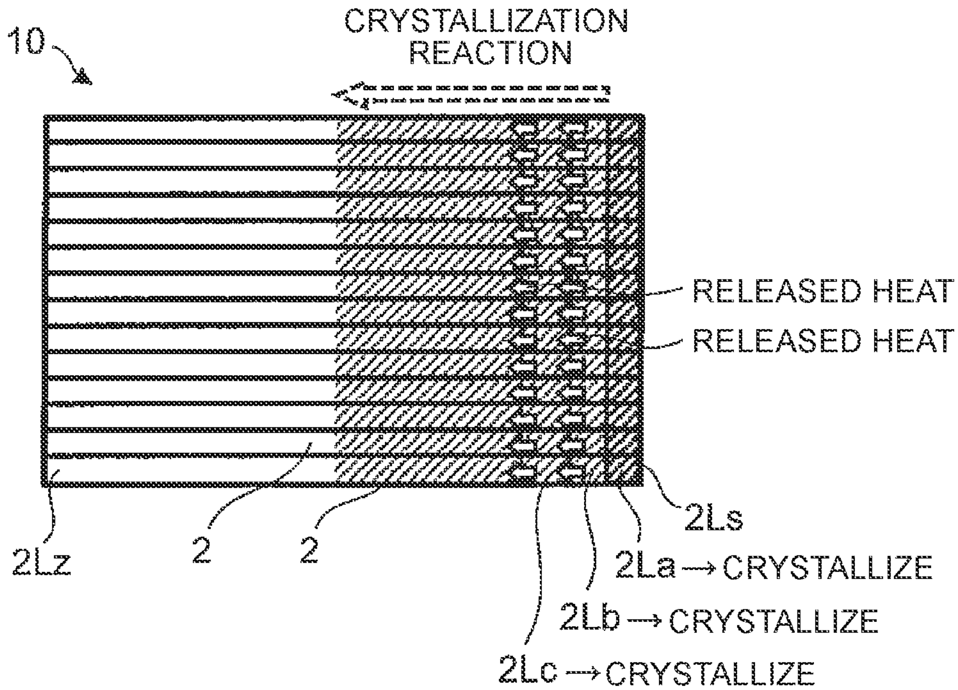
FIG. 8B is a schematic diagram illustrating how the crystallization reaction is caused by the second heat treatment step shown in FIG. 6C.
Figure 9:
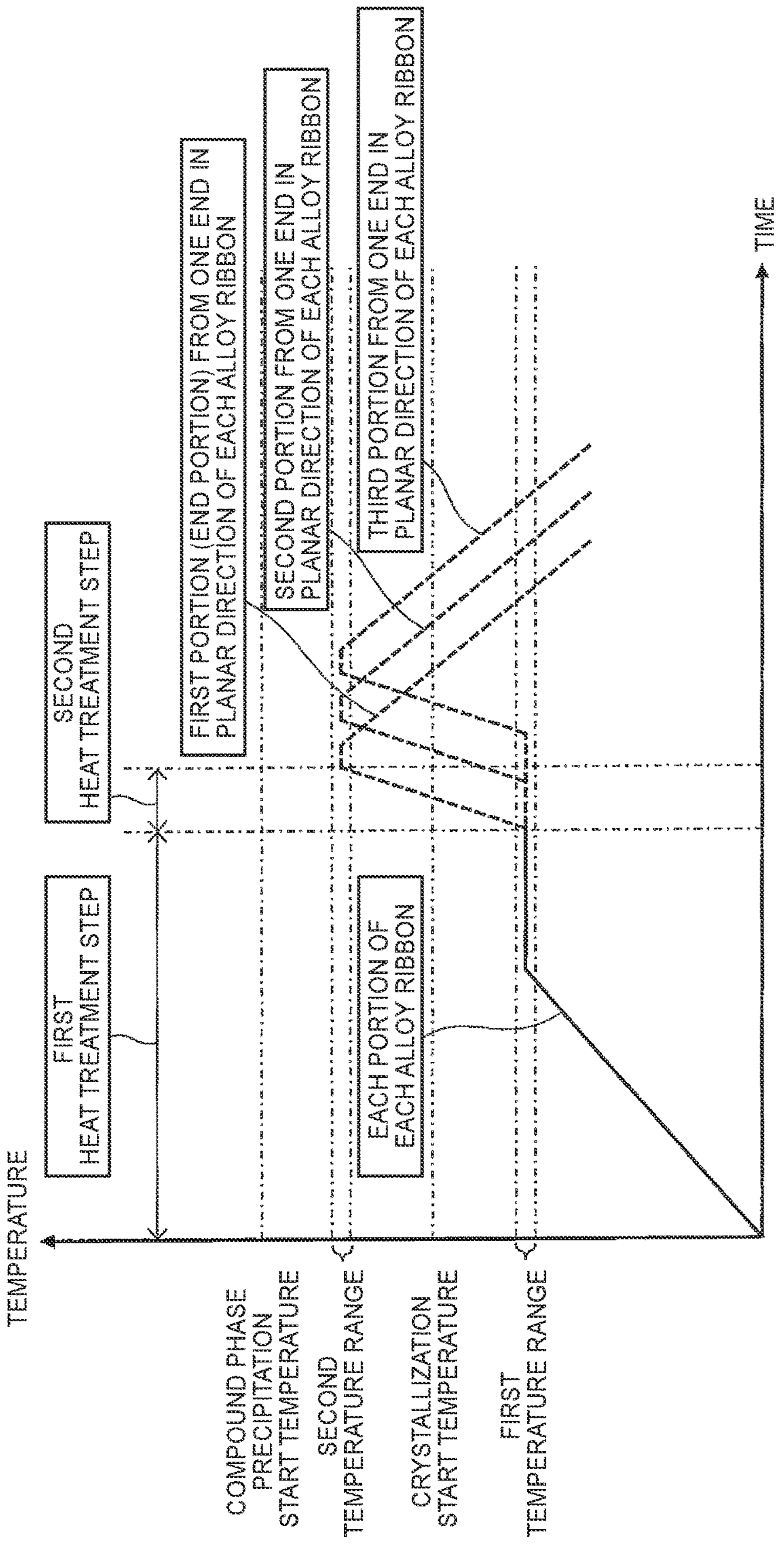
FIG. 9 is a graph schematically showing the temperature profile of each portion of each amorphous alloy ribbon of a stack in the method for producing an alloy ribbon shown in FIGS. 6A to 6C.

FIGS. 6A to 6C are schematic process diagrams illustrating another example of the method for producing an alloy ribbon according to the embodiment. FIG. 7 is a schematic diagram illustrating the second heat treatment step shown in FIG. 6C. FIGS. 8A and 8B are schematic diagrams illustrating how a crystallization reaction is caused by the second heat treatment step shown in FIG. 6C. FIG. 9 is a graph schematically showing the temperature profile of each portion of each amorphous alloy ribbon of the stack in the method for producing an alloy ribbon show in FIGS. 6A to 6C. The graph of FIG. 9 partially shows the temperature profiles at the central positions of the portions including the first, second, and third portions from one end in the planar direction of each amorphous alloy ribbon toward the opposite end.

In the method for producing an alloy ribbon according to this example, a stack 10 of a plurality of amorphous alloy ribbons 2 is first prepared as shown in FIG. 6A (preparation step).

Next, as shown in FIG. 6B, the stack 10 is moved into a heating furnace 20 and heated to the first temperature range lower than the crystallization start temperature of the amorphous alloy ribbons 2 in the heating furnace 20 (first heat treatment step). Specifically, as shown by, e.g., the temperature profiles of FIG. 9, the entire stack 10 is soaked so that the overall temperature of all the amorphous alloy ribbons 2 of the stack 10 is within the first temperature range.

Then, as shown in FIGS. 6C and 7, the high temperature heat source 30 is moved into the heating furnace 20, where one end faces 2Ls in the planar direction of all the amorphous alloy ribbons 2 of the stack 10 are in contact with the high temperature heat source 30 for a short time. As shown in the temperature profiles of FIG. 9, end portions 2La of all the amorphous alloy ribbons 2, which are the first portions from the one end in the planar direction, are heated to the second temperature range equal to or higher than the crystallization start temperature while the portions of all the amorphous alloy ribbons 2 other than the end portions 2La are kept in the temperature range lower than the crystallization start temperature (second heat treatment step).

In this example, after the first heat treatment step, the ambient temperature of the stack 10 is held so that the entire stack 10 is kept in such a temperature range that the stack 10 can be crystallized by heating the end portions 2La of all the amorphous alloy ribbons 2 to the second temperature range in the second heat treatment step. In other words, after the first heat treatment step, the ambient temperature of the stack 10 is held so that the entire stack 10 is kept in such a temperature range that crystallization of the entire stack 10 can occur by heating the end portions 2La of all the amorphous alloy ribbons 2 to the second temperature range in the second heat treatment step.

The following expression (1) is satisfied, where Q1 represents the amount of heat required to heat the entire stack 10 to the first temperature range in the first heat treatment step, Q2 represents the amount of heat that is applied to the stack 10 when heating the end portions 2La of all the amorphous alloy ribbons 2 to the second temperature range in the second heat treatment step, Q3 represents the amount of heat that is released during crystallization of the stack 10, and Q4 represents the amount of heat required to heat the entire stack 10 to the crystallization start temperature.

$$Q1+Q2+Q3 \geq Q4 \quad (1)$$

In this example, the end portions 2La of all the amorphous alloy ribbons 2 are heated to the second temperature range equal to or higher than the crystallization start temperature in the second heat treatment step. The end portions 2La are thus crystallized as shown in FIG. 8A. As can be seen from the DSC curve of FIG. 5, the end portions 2La release heat due to the crystallization reaction. In all the amorphous alloy ribbons 2, the heat thus released transfers from the end portions 2La having a high temperature after the crystallization reaction to the second portions 2Lb from the one end in the planar direction which have a low temperature.

Since the ambient temperature of the stack 10 is held as described above and the expression (1) is satisfied, the second portions 2Lb of all the amorphous alloy ribbons 2 are heated mainly by the released heat to the second temperature range, as shown by the temperature profile of FIG. 9. The second portions 2Lb of all the amorphous alloy ribbons 2 are thus crystallized and release heat due to the crystallization reaction, as shown in FIG. 8B. Similarly, the third portions 2Lc of all the amorphous alloy ribbons 2 are heated mainly by the heat released from the second portions 2Lb to the second temperature range, as shown by the temperature profile of FIG. 9. The third portions 2Lc of all the amorphous alloy ribbons 2 are thus crystallized and release heat due to the crystallization reaction, as shown in FIG. 8B.

As shown in FIG. 8B, such a crystallization reaction and heat release due to the crystallization reaction repeatedly occur so as to propagate from the one end portions 2La to the opposite end portions 2Lz in the planar direction of all the amorphous alloy ribbons 2. All the amorphous alloy ribbons 2 of the stack 10 are thus entirely crystallized by merely heating the stack 10 to the first temperature range in the first heat treatment step and then heating the end portions 2La of all the amorphous alloy ribbons 2 to the second temperature range in the second heat treatment step. The thickness (the number of amorphous alloy ribbons 2) of the stack 10 is not particularly limited.

According to the present embodiment, as in the examples of FIGS. 1A to 1C and FIGS. 6A to 6C, the crystallization reaction is caused so as to propagate through the stack of the plurality of amorphous alloy ribbons by merely heating the stack to the first temperature range lower than the crystallization start temperature of the amorphous alloy ribbons in the first heat treatment step and then heating the end of the stack to the second temperature range equal to or higher than the crystallization start temperature in the second heat treatment step. For example, the entire stack, whose thickness (the number of amorphous alloy ribbons) is not limited, is thus crystallized. Alloy ribbons, which are crystallized amorphous alloy ribbons, are thus produced with high productivity.

The method for producing an alloy ribbon according to the embodiment will be described in detail mainly with respect to the conditions.

1. Preparation Step

A stack of a plurality of amorphous alloy ribbons is prepared in the preparation step.

The material of the amorphous alloy ribbons is not particularly limited as long as it is an amorphous alloy. Examples of the material of the amorphous alloy ribbons include a Fe group amorphous alloy, a Ni group amorphous alloy, and a Co group amorphous alloy. Among these, the Fe group amorphous alloy is preferred. The "Fe group amorphous alloy" means an amorphous alloy mainly containing Fe with impurities such as, e.g., B, Si, C, P, Cu, Nb, or Zr. The "Ni group amorphous alloy" means an amorphous alloy mainly containing Ni. The "Co group amorphous alloy" means an amorphous alloy mainly containing Co.

For example, the Fe group amorphous alloy preferably contains 84 atom % or more of Fe. The Fe group amorphous alloy with a higher Fe content is more preferable. This is because the magnetic flux density of alloy ribbons, which are crystallized amorphous alloy ribbons, varies depending on the Fe content.

Although the shape of the amorphous alloy ribbons is not particularly limited, the amorphous alloy ribbons may have, e.g., a simple rectangular or circular shape, the shape of alloy ribbons that are used for cores (a stator core, a rotor core, etc.) for parts such as a motor and a transformer, etc. For example, in the case where the material of the amorphous alloy ribbons is a Fe group amorphous alloy, the size (length by width) of rectangular amorphous alloy ribbons is, e.g., 100 mm by 100 mm, and the diameter of circular amorphous alloy ribbons is, e.g., 150 mm.

The thickness of the amorphous alloy ribbons is not particularly limited. The thickness of the amorphous alloy ribbons varies depending on the material etc. of the amorphous alloy ribbons. In the case where the material of the amorphous alloy ribbons is a Fe group amorphous alloy, the thickness of the amorphous alloy ribbons is, e.g., within the range of 10 μm or more and 100 μm or less and is preferably within the range of 20 μm or more and 50 μm or less.

The number of amorphous alloy ribbons of the stack is not particularly limited. The number of amorphous alloy ribbons of the stack varies depending on the material etc. of the amorphous alloy ribbons. In the case where the material of the amorphous alloy ribbons is a Fe group amorphous alloy, the number of amorphous alloy ribbons of the stack is preferably, e.g., 500 or more and 10,000 or less. When the number of amorphous alloy ribbons is too small, nanocrystalline alloy ribbons cannot be produced with high productivity. When the number of amorphous alloy ribbons is too large, it is difficult to transport the amorphous alloy ribbons etc. and thus to handle them.

The thickness of the stack is not particularly limited. The thickness of the stack varies depending on the material etc. of the amorphous alloy ribbons. In the case where the material of the amorphous alloy ribbons is a Fe group amorphous alloy, the thickness of the stack is preferably, e.g., 1 mm or more and 150 mm or less. When the stack is too thin, nanocrystalline alloy ribbons cannot be produced with high productivity. When the stack is too thick, it is difficult to transport stacks etc. and thus to handle them.

2. First Heat Treatment Step

In the first heat treatment step, the stack is heated to the first temperature range lower than the crystallization start temperature of the amorphous alloy ribbons. Specifically, for example, the entire stack is soaked so that the overall temperature of all the amorphous alloy ribbons of the stack is within the first temperature range.

As used herein, the "crystallization start temperature" means the temperature at which crystallization of the amorphous alloy ribbons starts when the amorphous alloy ribbons are heated. Crystallization of the amorphous alloy ribbons varies depending on the material etc. of the amorphous alloy ribbons. In the case where the material of the amorphous alloy ribbons is a Fe group amorphous alloy, crystallization means, e.g., precipitation of fine bcc-Fe crystals. The crystallization start temperature varies depending on the material etc. of the amorphous alloy ribbons and the heating rate. The higher the heating rate, the higher the crystallization start temperature tends to be. In the case where the material of the amorphous alloy ribbons is a Fe group amorphous alloy, the crystallization start temperature is within the range of, e.g., 350° C. to 500° C.

The first temperature range is, e.g., in such a temperature range that the entire stack can be crystallized by heating the end of the stack to the second temperature range, described later, which is equal to or higher than the crystallization start temperature, with the stack being kept in the first temperature range.

The first temperature range is not particularly limited. The first temperature range varies depending on the material etc. of the amorphous alloy ribbons. In the case where the material of the amorphous alloy ribbons is a Fe group amorphous alloy, the first temperature range is preferably, e.g., the range of the crystallization start temperature minus 100° C. or higher and lower than the crystallization start temperature. When the first temperature range is too low, there may be a risk that not the entire stack can be crystallized by the second heat treatment step. When the first temperature range is too high, there is a risk that grain coarsening or precipitation of compound phases occurs in the stack by the second heat treatment step, and depending on variation in material of the alloy ribbons, there is a risk that crystallization may start in a part of the stack by the first heat treatment step.

3. Second Heat Treatment Step

After the first heat treatment step, the end of the stack is heated to the second temperature range equal to or higher than the crystallization start temperature in the second heat treatment step. Specifically, after the first heat treatment step, the end of the stack is heated to the second temperature range equal to or higher than the crystallization start temperature with the part of the stack other than this end being kept in the temperature range lower than the crystallization start temperature, and is kept in the second temperature range for a time required for crystallization. The amorphous alloy in the end of the stack is thus crystallized into a nanocrystalline alloy.

The second temperature range is not particularly limited but is preferably a temperature range lower than a compound phase precipitation start temperature because precipitation of compound phases is restrained. As used herein, the "compound phase precipitation start temperature" means the temperature at which precipitation of compound phases starts when the crystallized amorphous alloy ribbons are further heated, as shown by the DSC curve of FIG. 5. The "compound phases" means compound phases that are precipitated when the crystallized amorphous alloy ribbons are further heated and that more significantly degrade soft magnetic properties than in the case where crystal grains are coarsened, like compound phases such as, e.g., Fe—B and Fe—P in the case where the material of the amorphous alloy ribbons is a Fe group amorphous alloy.

The second temperature range is not particularly limited. The second temperature range varies depending on the material etc. of the amorphous alloy ribbons. In the case where the material of the amorphous alloy ribbons is a Fe group amorphous alloy, the second temperature range is preferably, e.g., the range of the crystallization start temperature or higher and lower than the crystallization start temperature plus 100° C., and particularly preferably the range of the crystallization start temperature plus 20° C. or higher and lower than the crystallization start temperature plus 50° C. When the second temperature range is too low, there may be a risk that not the entire stack can be crystallized. When the second temperature range is too high, there is a risk that grain coarsening or precipitation of compound phases occurs in the stack.

The end of the stack which is heated in the second heat treatment step is preferably an end of the stack in the stacking direction, as in the case where, e.g., the entire first amorphous alloy ribbon 2A from the one end of the stack 10 in the stacking direction is heated to the second temperature range in the example shown in FIGS. 1A to 1C. In this case, the stack is uniformly heated in the planar direction. For example, the end of the stack in the stacking direction is the entire region, a part, etc. in the planar direction of the end of the stack in the stacking direction, like the entire first amorphous alloy ribbon 2A shown in FIG. 2. However, the end of the stack in the stacking direction is preferably the entire region in the planar direction of the end of the stack in the stacking direction. As used herein, the "planar direction" means the direction perpendicular to the stacking direction of the stack.

When heating the end of the stack in the stacking direction to the second temperature range, it is preferable to heat the end of the stack in the stacking direction with the stack being pressed in the stacking direction. In this case, heat is satisfactorily conducted between the alloy ribbons in the stacking direction and the crystallization reaction therefore more easily propagates in the stacking direction of the stack. Especially in the case where cores that are used for parts are produced, the stack is prepared in a pressed state, and therefore the process can be shortened as the stack is heated in an assembled state.

The end of the stack which is heated in the second heat treatment step is preferably an end in the planar direction of the stack, as in the case where, e.g., the one end portions 2La in the planar direction of all the amorphous alloy ribbons 2 of the stack 10 are heated to the second temperature range in the example shown in FIGS. 6A to 6C. In this case, heat is more satisfactorily conducted within each alloy ribbon than between the alloy ribbons and the crystallization reaction propagates by such heat conduction. The crystallization reaction therefore more easily propagates through the stack. The end in the planar direction of the stack is, e.g., one end portions in the planar direction of all the amorphous alloy ribbons of the stack, etc.

The end of the stack which is heated in the second heat treatment step may be either an end located in a single continuous region or ends located in a plurality of separate regions. Examples of the combination of the ends located in a plurality of separate regions include a combination of one end and the other end of the stack in the stacking direction and a combination of an end of the stack in the stacking direction and an end in the planar direction of the stack.

A method for heating the end of the stack to the second temperature range is not particularly limited as long as the amorphous alloy in the end of the stack is crystallized. Examples of the heating method include a method in which an end face of the stack is placed in contact with a high temperature heat source as in the examples shown in FIGS. 1A to 1C and FIGS. 6A to 6C and radiation heating using a lamp. Examples of the high temperature heat source include high temperature plates with high heat conductivities which are comprised of copper etc., high temperature liquids such as a salt bath, heaters, and high frequencies.

A method for placing the end of the stack in contact with the high temperature heat source is not particularly limited as long as the end of the stack is heated to the second temperature range and kept in the second temperature range for the time required for crystallization. For example, the contact time, the contact area, etc. can be set as appropriate according to the number of amorphous alloy ribbons of the stack, the size of the alloy ribbons, etc. so that entire stack can be crystallized without causing precipitation of compound phases and grain coarsening. For example, the contact time is set to a short time when the number of alloy ribbons of the stack is small, and the contact time is set to a long time when the number of alloy ribbons of the stack is large.

In the second heat treatment step, for example, the stack may be moved from a heat treatment furnace for the first heat treatment step into a heat treatment furnace in a different chamber and may be placed in contact with a high temperature heat source in the different chamber, as in the example shown in FIGS. 1A to 1C. Alternatively, after the first heat treatment step, a high temperature heat source may be moved into the heat treatment furnace for the first heat treatment step so that the stack is in contact with the high temperature heat source, as in the example shown in FIGS. 6A to 6C.

4. Ambient Temperature

In the method for producing an alloy ribbon according to the embodiment, after the first heat treatment step, the ambient temperature of the stack is held so that the stack is kept in such a temperature range that the stack can be crystallized by heating the end of the stack to the second temperature range in the second heat treatment step (hereinafter such a temperature range is sometimes referred to as the "crystallizable temperature range"). In other words, after the first heat treatment step, the ambient temperature of the stack is held so that the stack is kept in such a temperature range that crystallization of the stack can occur by heating the end of the stack to the second temperature range in the second heat treatment step. Specifically, after the first heat treatment step, the ambient temperature of the stack is held so that the amorphous portions of the alloy ribbons of the stack are kept in the crystallizable temperature range.

The temperature at which the ambient temperature is held is not particularly limited. The temperature at which the ambient temperature is held varies depending on the material etc. of the amorphous alloy ribbons. In the case where the material of the amorphous alloy ribbons is a Fe group amorphous alloy, the temperature at which the ambient temperature is held is preferably within the range of the lower limit of the first temperature range minus 10° C. or higher and the upper limit of the first temperature range or lower, and particularly preferably within the first temperature range. When this temperature is too low, there is a risk that the crystallization reaction may not be caused so as to propagate through the stack. When this temperature is too high, there is a risk that grain coarsening or precipitation of compound phases occurs in the stack, and required cost is high.

5. Relationship Among Amounts of Heat

In the method for producing an alloy ribbon according to the embodiment, the following expression (1) is satisfied, where Q1 represents the amount of heat required to heat the stack to the first temperature range in the first heat treatment step, Q2 represents the amount of heat that is applied to the stack when heating the end of the stack to the second temperature range in the second heat treatment step, Q3 represents the amount of heat that is released during crystallization of the stack, and Q4 represents the amount of heat required to heat the entire stack to the crystallization start temperature. When the following expression (1) is not satisfied, there is a risk that not the entire stack can be crystallized. More specifically, in the temperature history of the stack in the case where the stack is heated with Q1 in the first heat treatment step, the end of the stack is heated with Q2 in the second heat treatment step, and the stack is heated with Q3 after the second heat treatment step, Q4 represents the amount of heat required to heat the entire stack from the state before the stack is heated with Q1 in the first heat treatment step to the crystallization start temperature. For example, in this case, especially in the temperature history of the stack in the case where there is no heat transfer between the stack and the outside other than heating with Q1 and Q2, Q4 represents the amount of heat required to heat the entire stack from the state before the stack is heated with Q1 in the first heat treatment step to the crystallization start temperature.

$$Q1+Q2+Q3\geq Q4 \quad (1)$$

In the case where the above expression (1) is satisfied, it is preferable that the following expression (1a) be satisfied for all the amorphous alloy ribbons of the stack, where Qa1 represents the amount of heat required to heat each amorphous alloy ribbon of the stack to the first temperature range out of Q1, Qa2 represents the amount of heat that is applied to the amorphous alloy ribbon out of Q2, Qa3 represents the amount of heat that is applied to the amorphous alloy ribbon out of Q3, and Qa4 represents the amount of heat required to heat the amorphous alloy ribbon to the crystallization start temperature out of Q4. When the following expression (1a) is satisfied, all the amorphous alloy ribbons can be crystallized. More specifically, in the temperature history of the amorphous alloy ribbon in the case where each amorphous alloy ribbon of the stack is heated with Qa1 in the first heat treatment step, the amorphous alloy ribbon is heated with Qa2 in the second heat treatment step, and the amorphous alloy ribbon is heated with Qa3 after the second heat treatment step, Qa4 represents the amount of heat required to heat the entire amorphous alloy ribbon from the state before the amorphous alloy ribbon is heated with Qa1 in the first heat treatment step to the crystallization start temperature. For example, in this case, especially in the temperature history of the amorphous alloy ribbon in the case where there is no heat transfer between the amorphous alloy ribbon and the outside other than heating with Qa1, Qa2, and Qa3, Qa4 represents the amount of heat required to heat the entire amorphous alloy ribbon from the state before the amorphous alloy ribbon is heated with Qa1 in the first heat treatment step to the crystallization start temperature. The examples shown in FIGS. 1A to 1C and FIGS. 6A to 6C satisfy the following expression (1a).

$$Qa1+Qa2+Qa3 \geq Qa4 \quad (1a)$$

In the method for producing an alloy ribbon according to the embodiment, the entire stack is usually crystallized by using the amount of heat that is released during crystallization of the stack. Accordingly, the amount of heat that is applied from the outside (the sum of Q1 and Q2) will not be larger than the amount of heat required to heat the entire stack to the crystallization start temperature, and the following expression (2) is satisfied.

$$Q1+Q2<Q4 \quad (2)$$

In the method for producing an alloy ribbon according to the embodiment, it is preferable that the following expression (3) be satisfied, where Q5 represents the amount of heat required to heat the entire stack to the compound phase precipitation start temperature. In this case, precipitation of compound phases is restrained. More specifically, in the temperature history of the stack in the case where the stack is heated with Q1 in the first heat treatment step, the end of the stack is heated with Q2 in the second heat treatment step, and the stack is heated with Q3 after the second heat treatment step, Q5 represents the amount of heat required to heat the entire stack from the state before the stack is heated with Q1 in the first heat treatment step to the compound phase precipitation start temperature. For example, in this case, especially in the temperature history of the stack in the case where there is no heat transfer between the stack and the outside other than heating with Q1 and Q2, Q5 represents the amount of heat required to heat the entire stack from the state before the stack is heated with Q1 in the first heat treatment step to the compound phase precipitation start temperature.

$$Q1+Q2+Q3<Q5 \quad (3)$$

In the case where the above expression (3) is satisfied, it is preferable that the following expression (3a) be satisfied for all the amorphous alloy ribbons of the stack, where Qa1 represents the amount of heat required to heat each amorphous alloy ribbon of the stack to the first temperature range out of Q1, Qa2 represents the amount of heat that is applied to the amorphous alloy ribbon out of Q2, Qa3 represents the amount of heat that is applied to the amorphous alloy ribbon out of Q3, and Qa5 represents the amount of heat required to heat the entire amorphous alloy ribbon to the compound phase precipitation start temperature. When the following expression (3a) is satisfied, precipitation of compound phases is restrained in all the amorphous alloy ribbon. More specifically, in the temperature history of the amorphous alloy ribbon in the case where each amorphous alloy ribbon of the stack is heated with Qa1 in the first heat treatment step, the amorphous alloy ribbon is heated with Qa2 in the second heat treatment step, and the amorphous alloy ribbon is heated with Qa3 after the second heat treatment step, Qa5 represents the amount of heat required to heat the entire amorphous alloy ribbon from the state before the amorphous alloy ribbon is heated with Qa1 in the first heat treatment step to the compound phase precipitation start temperature. For example, in this case, especially in the temperature history of the amorphous alloy ribbon in the case where there is no heat transfer between the amorphous alloy ribbon and the outside other than heating with Qa1, Qa2, and Qa3, Qa5 represents the amount of heat required to heat the entire amorphous alloy ribbon from the state before the amorphous alloy ribbon is heated with Qa1 in the first heat treatment step to the compound phase precipitation start temperature.

$$Qa1+Qa2+Qa3<Qa5 \quad (3a)$$

6. Method for Producing an Alloy Ribbon

In the method for producing an alloy ribbon according to the embodiment, the stack is crystallized from its end heated to the second temperature range. A plurality of nanocrystalline alloy ribbons, which are the plurality of crystallized amorphous alloy ribbons of the stack, are thus produced.

As used herein, the "nanocrystalline amorphous alloy ribbons" means amorphous alloy ribbons having desired soft magnetic properties such as coercivity as fine crystal grains are precipitated without substantially causing precipitation of compound phases and grain coarsening. The material of the nanocrystalline amorphous alloy ribbons varies depending on the material etc. of the amorphous alloy ribbons. In the case where the material of the amorphous alloy ribbons is a Fe group amorphous alloy, the material of the nanocrystalline amorphous alloy ribbons is, e.g., a Fe group nanocrystalline alloy having a multiphase structure of Fe or Fe alloy crystal grains (e.g., fine bcc-Fe crystals etc.) and an amorphous phase.

The grain size of the crystal grains of the nanocrystalline alloy ribbons is not particularly limited as long as the nanocrystalline alloy ribbons have desired soft magnetic properties. The grain size of the crystal grains of the nanocrystalline alloy ribbons varies depending on the material etc. of the nanocrystalline alloy ribbons. In the case where the material of the nanocrystalline alloy ribbons is a Fe group nanocrystalline alloy, the grain size of the crystal grains of the nanocrystalline alloy ribbons is preferably, e.g., 25 nm or less. This is because coercivity is reduced as the crystal grains get coarser.

The grain size of the crystal grains can be measured by direct observation using a transmission electron microscope (TEM). The grain size of the crystal grains can also be estimated from the coercivity or temperature profiles of the nanocrystalline alloy ribbons.

The coercivity of the nanocrystalline alloy ribbons varies depending on the material etc. of the nanocrystalline alloy ribbons. In the case where the material of the nanocrystalline alloy ribbons is a Fe group nanocrystalline alloy, the coercivity of the nanocrystalline alloy ribbons is, e.g., 20 A/m or less, and preferably 10 A/m or less. With such low coercivity, loss in, e.g., cores for motors etc. is effectively reduced. Since the conditions such as the temperature range in each heat treatment step according to the embodiment are limited, there is a limit to reduction in coercivity of the nanocrystalline alloy ribbons.

It is preferable that the method for producing an alloy ribbon according to the embodiment further include the heat dissipation step of placing a heat dissipating member in contact with the opposite end of the stack as in the example shown in FIGS. 1A to 1C. Dissipating heat from the opposite end of the stack restrains heat accumulation in a part of the stack which is close to the opposite end due to the heat released by the crystallization reaction and thus restrains grain coarsening and precipitation of compound phases. The heat dissipation step may be either the step of placing the heat dissipating member in contact with the opposite end of the stack before heating the end of the stack to the second temperature range in the second heat treatment step or the step of placing the heat dissipating member in contact with the opposite end of the stack after heating the end of the stack to the second temperature range in the second heat treatment step. However, the heat dissipation step is usually the step of placing the heat dissipating member in contact with the opposite end of the stack after heating the end of the stack to the second temperature range in the second heat treatment step as in the example shown in FIGS. 1A to 1C, because heat accumulation is effectively restrained.

The method for producing an alloy ribbon according to the embodiment is not particularly limited as long as a plurality of nanocrystalline alloy ribbons can be produced. For example, a production method is preferable in which the entire stack (specifically, e.g., all the entire amorphous alloy ribbons of the stack) is crystallized without substantially causing precipitation of compound phases and grain coarsening so that the nanocrystalline alloy ribbons have a desired grain size. In this method for producing an alloy ribbon, not only the conditions described above but also other conditions can be suitably set in order to crystallize the entire stack without substantially causing precipitation of compound phases and grain coarsening so that the nanocrystalline alloy ribbons have a desired grain size. It is possible to either suitably set each condition independently, or to suitably set combinations of the conditions.

7. Other Forms

Figure 10A:
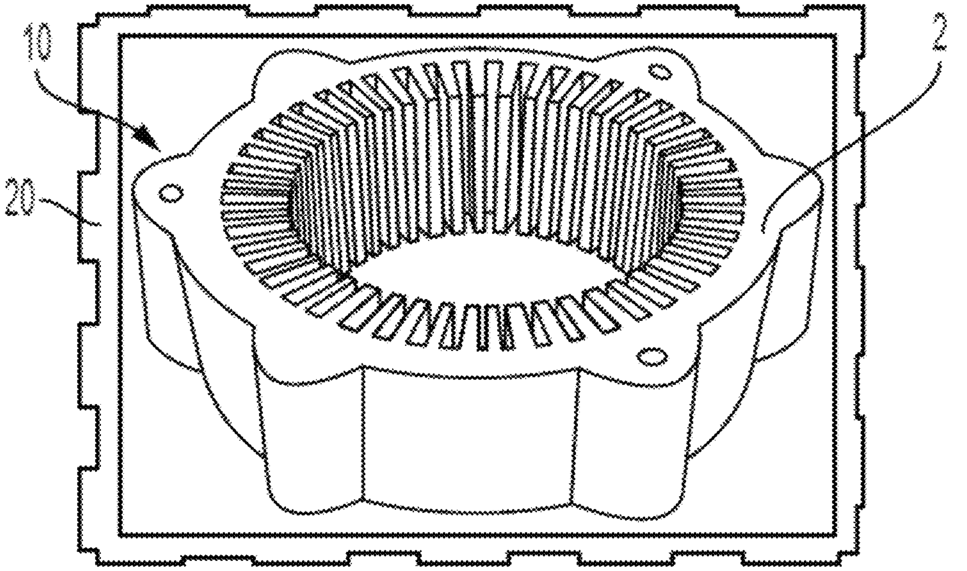
FIG. 10A is a schematic process diagram illustrating still another example of the method for producing an alloy ribbon according to the embodiment of the disclosure.
Figure 10B:
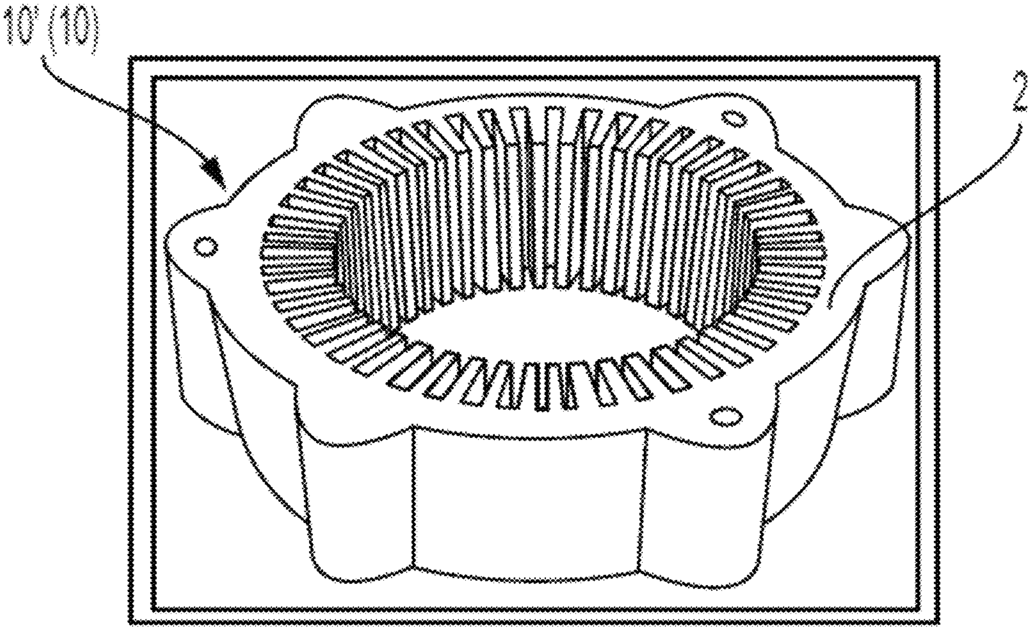
FIG. 10B is a schematic process diagram illustrating the still another example of the method for producing an alloy ribbon according to the embodiment of the disclosure.

Other forms of the method for producing an alloy ribbon according to the embodiment will be described. FIGS. 10A and 10B are schematic process diagrams illustrating still another example of the method for producing an alloy ribbon according to the embodiment.

In this example, as shown in FIG. 10A, a plurality of amorphous alloy ribbons 2 are first stacked to prepare a stack 10 in the shape of a stator core in the preparation step. The stack 10 is then moved into the heating furnace 20, where the stack 10 is subjected to the first heat treatment step and the second heat treatment step according to the embodiment.

In this case, after the first heat treatment step, the ambient temperature of the stack 10 is held so that the stack 10 is kept in the crystallizable temperature range, and the following expression (1) is satisfied.

$$Q1+Q2+Q3\geq Q4 \quad (1)$$

Subsequently, as shown in FIG. 10B, the stack 10 is impregnated with a resin and is fixed. A stator core 10' is produced in this manner.

In the method for producing an alloy ribbon according to the embodiment, as in this example, a stack in the shape of, e.g., a core that is used for parts may be prepared in the preparation step. In this case, cores using the stack of alloy ribbons that are crystallized amorphous alloy ribbons can be produced with high productivity.

The method for producing an alloy ribbon according to the embodiment will be specifically described with respect to examples and a reference example.

1. Examples in which the End of the Stack in the Stacking Direction is Heated in the Second Heat Treatment Step Examples of the method for producing an alloy ribbon in which the end of the stack in the stacking direction is heated in the second heat treatment step will be described.

Example 1-1

A simulation of the above method for producing an alloy ribbon is carried out using computer aided engineering (CAE). This will be specifically described below.

Model of Computation for Stack of Amorphous Alloy Ribbons

Figure 11:
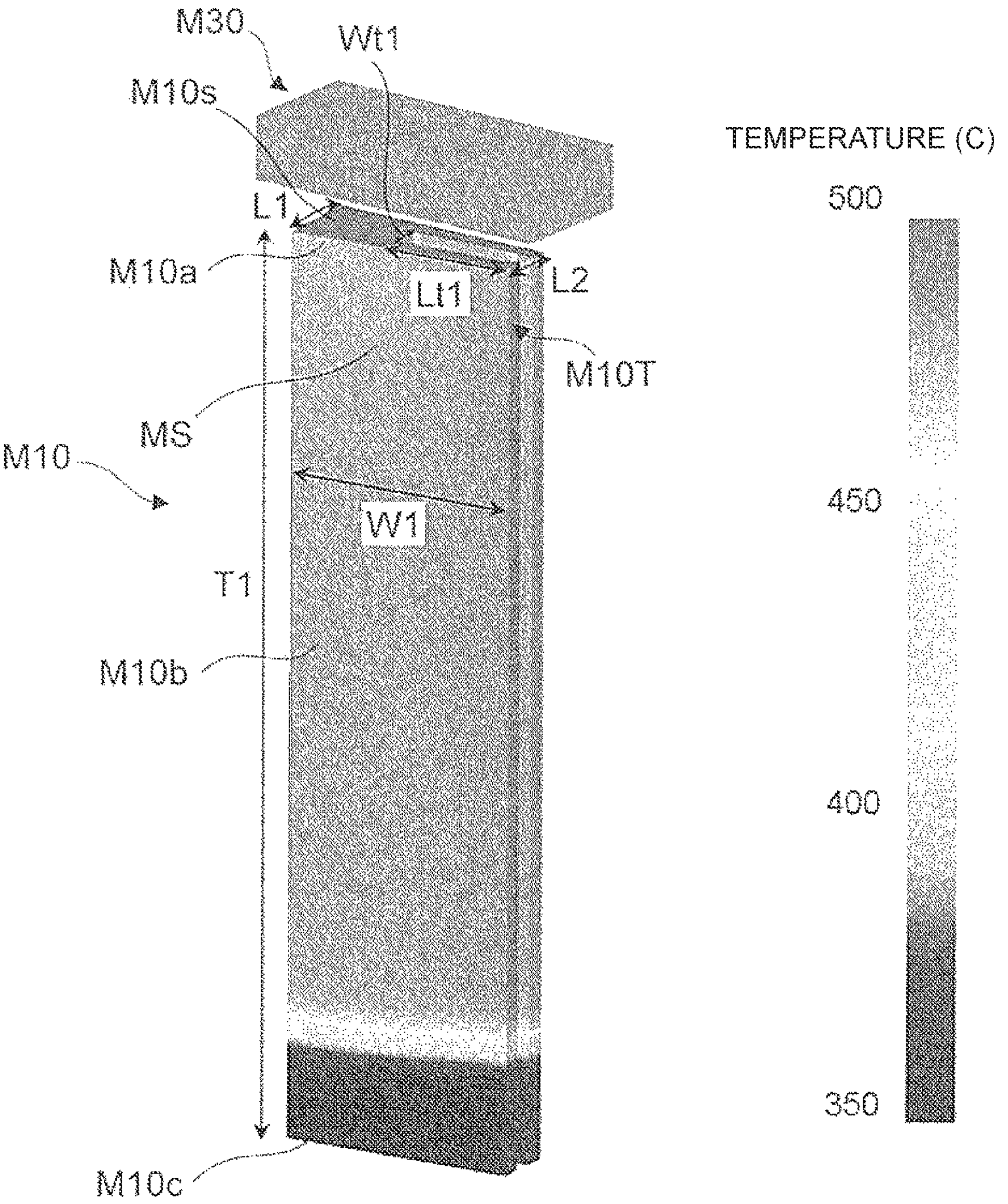
FIG. 11 is an image showing the temperatures at each position in a model of computation for a stack 400 seconds after heating of an upper end in Example 1-1.

A model of computation M10 for a stack having the shape shown in FIG. 11 was created as a model of computation for a stack of amorphous alloy ribbons for use in this simulation. The model of computation M10 for the stack has the shape of a divided part of a stack to be used for stator cores, namely a part of the stack as divided by a plane of symmetry (corresponding to a plane of symmetry MS of the model of computation M10) located in a tooth portion of the stack (corresponding to a tooth portion M10T of the model of computation M10). The stack was simplified by integrating a plurality of amorphous alloy ribbons into a single piece and was modeled in view of heat transfer between the amorphous alloy ribbons adjacent to each other in the stacking direction.

Parameters required for simulation for amorphous alloy ribbons were set as follows on the assumption that the model of computation M10 for the stack was a stack of amorphous alloy ribbons comprised of a common Fe group amorphous alloy.

Crystallization start temperature: 360° C., compound phase precipitation start temperature: 530° C., thermal conductivity (in the stacking direction): 4 W/mK, and amount of heat released due to crystallization: 90 J/g.

The size of each portion of the model of computation M10 for the stack was set as follows.

Thickness T1 in the stacking direction: 150 mm, length L1 of a portion corresponding to a part of the outer periphery of the alloy ribbon: 14 mm, length L2 of a portion corresponding to a part of the inner periphery of the alloy ribbon: 9 mm, radial width W1: 40 mm, radial length Lt1 of the tooth portion M10T: 35 mm, and circumferential width Wt1 of a groove between the tooth portions Mi OT: 5 mm.

Simulation Using CAE

The simulation using CAE was carried out under the following conditions.

Simulation software: DEFORM made by Scientific Forming Technologies Corporation (SFTC)

In this simulation, the entire model of computation M10 for the stack was first soaked to 320° C. that is lower than the crystallization start temperature (first heat treatment step).

Next, a model M30 for a high temperature heat source soaked to 500° C., which is shown in FIG. 11, was placed in contact with an upper end face M10*s* in the stacking direction of the model of computation M10 for the stack for 60 seconds to heat an upper end M10*a* in the stacking direction of the model of computation M10 for the stack to a temperature range equal to or higher than the crystallization start temperature (second heat treatment step).

In this simulation, after the first heat treatment step, the ambient temperature of the model of computation M10 for the stack was held at 320° C. so that the entire model of computation M10 for the stack was kept in such a temperature range that the model of computation M10 for the stack could be crystallized by heating the upper end M10*a* in the stacking direction of the model of computation M10 for the stack to a temperature range equal to or higher than the crystallization start temperature in the second heat treatment step. The above expression (1) according to the embodiment was also satisfied. Heat transfer between the model of computation M10 for the stack and the ambient temperature thereof was also included.

Analysis Results

Figure 12:
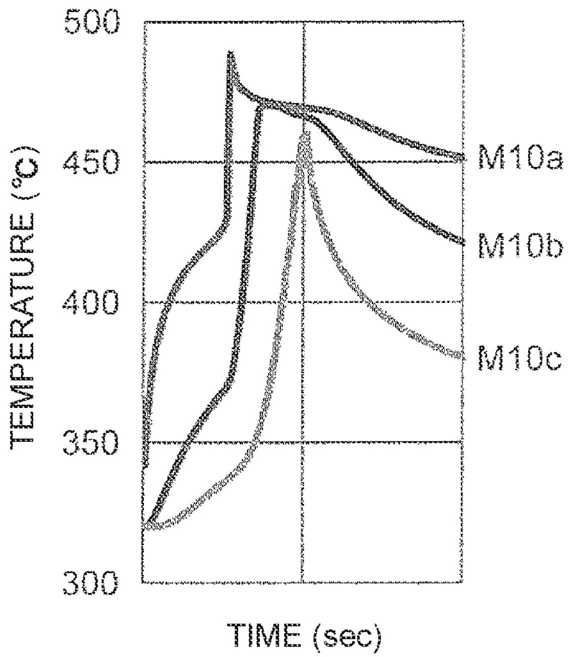
FIG. 12 is a graph showing temperature changes of an upper end, a middle portion, and a lower end in the stacking direction of the model of computation for the stack in Example 1-1.

In this simulation, temperature changes at each position in the model of computation M10 for the stack were analyzed after the upper end M10*a* in the stacking direction of the model of computation M10 for the stack was heated to the temperature range equal to or higher than the crystallization start temperature in the second heat treatment step. FIG. 11 is an image showing the temperatures at each position in the model of computation for the stack 400 seconds after heating of the upper end in Example 1-1. FIG. 12 is a graph showing temperature changes of the upper end, the middle portion, and the lower end in the stacking direction of the model of computation for the stack in Example 1-1.

As shown in FIG. 11, after the upper end M10*a* in the stacking direction of the model of computation M10 for the stack was heated, the upper end M10*a*, a middle portion M10*b*, and a lower end M10*c* in the stacking direction of the model of computation M10 sequentially reached the crystallization start temperature or higher in this order. Most of the model of computation M10 for the stack reached the crystallization start temperature or higher 400 seconds after heating of the upper end M10*a*. Although not shown in the figure, the entire model of computation M10 reached the crystallization start temperature or higher 450 seconds after heating of the upper end M10*a*. In order to complete crystallization of each portion of the stack, it is necessary to hold each portion of the stack at a temperature equal to or higher than the crystallization start temperature for a certain time.

As shown in FIG. 12, the temperature of the upper end M10*a* decreased after increasing to the crystallization start temperature or higher, the temperature of the middle portion M10*b* decreased after increasing to the crystallization start temperature or higher later than the upper end M10*a*, and the temperature of the lower end M10*c* decreased after increasing to the crystallization start temperature or higher later than the middle portion M10*b*.

Example 1-2

An experiment of the above method for producing an alloy ribbon was carried out. This will be specifically described below.

Stack of Amorphous Alloy Ribbons

A stack shaped to be used for stator cores was produced as a stack of amorphous alloy ribbons for use in this experiment.

The stack was produced by stacking amorphous alloy ribbons comprised of a Fe group amorphous alloy containing 84 atoms % or more of Fe. The thickness of the alloy ribbons, the number of alloy ribbons of the stack, and the size of each portion were as follows.

Thickness of the alloy ribbons: 0.025 mm, shape of the alloy ribbons: 50 mm by 50 mm (length by width) rectangle, and number of alloy ribbons of the stack: 500.

Experiment of Method for Producing an Alloy Ribbon

Figure 13A:
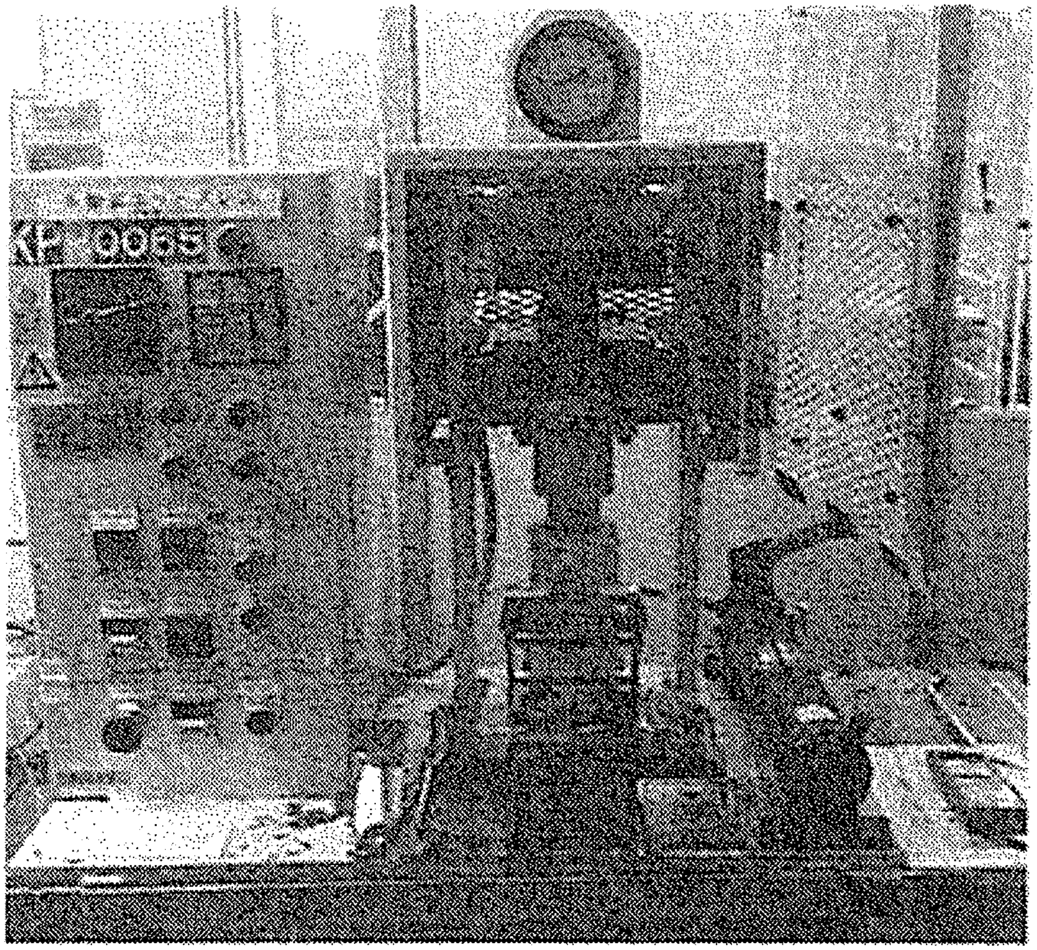
FIG. 13A is an image showing experimental equipment for the method for producing an alloy ribbon in Example 1-2.
Figure 13B:
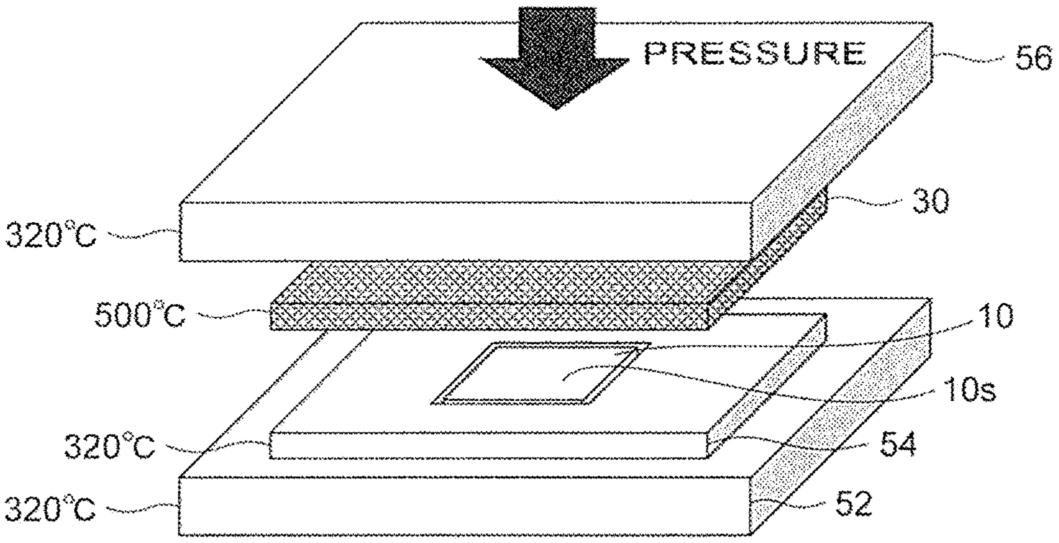
FIG. 13B is a schematic diagram illustrating an experiment of the method for producing an alloy ribbon in Example 1-2.

FIG. 13A is an image showing experimental equipment for the method for producing an alloy ribbon in Example 1-2. FIG. 13B is a schematic diagram illustrating the experiment of the method for producing an alloy ribbon in Example 1-2. The experiment was carried out using experimental equipment 100 shown in FIG. 13A in a manner schematically illustrated in FIG. 13B.

In this experiment, as shown in FIG. 13B, the stack 10 was first placed on the upper surface of a lower die 52 soaked to 320° C. and surrounded by an anti-heat dissipation member 54 soaked to 320° C. such that the stack 10 was not in contact with the anti-heat dissipation member 54. An upper die 56 soaked to 320° C. was then placed on the stack 10, the anti-heat dissipation member 54, and the lower die 52. The stack 10 was held in this state for 10 minutes. The entire stack 10 was thus soaked to a temperature range lower than the crystallization start temperature (first heat treatment step).

Next, as shown in FIG. 13B, the upper die 56 was removed, and a high temperature heat source (high temperature plate) 30 soaked to 470° C. was pressed against an upper end face 10*s* of the stack 10 in the stacking direction with the upper die 56. The stack 10 was held pressed with a pressure of 5 MPa in the stacking direction for one minute. The amorphous alloy ribbon in the upper end of the stack 10 in the stacking direction was thus heated to a temperature range equal to or higher than the crystallization start temperature (second heat treatment step).

In this experiment, after the first heat treatment step, the ambient temperature of the stack 10 was held by the lower die 52, the anti-heat dissipation member 54, and the upper die 56 so that the entire stack 10 was kept in such a temperature range that the stack 10 could be crystallized by heating the amorphous alloy ribbon in the upper end of the stack 10 in the stacking direction to a temperature range equal to or higher than the crystallization start temperature in the second heat treatment step. The above expression (1) according to the embodiment was also satisfied.

Experimental Results

Figure 14A:
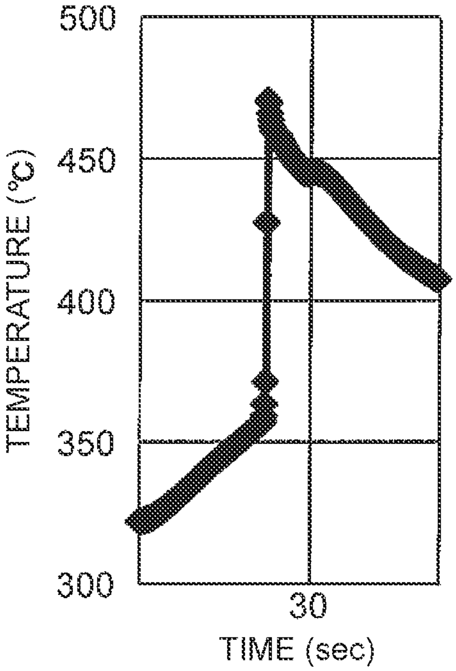
FIG. 14A is a graph showing a temperature change of an alloy ribbon in an upper end in the stacking direction of a stack in Example 1-2.
Figure 14B:
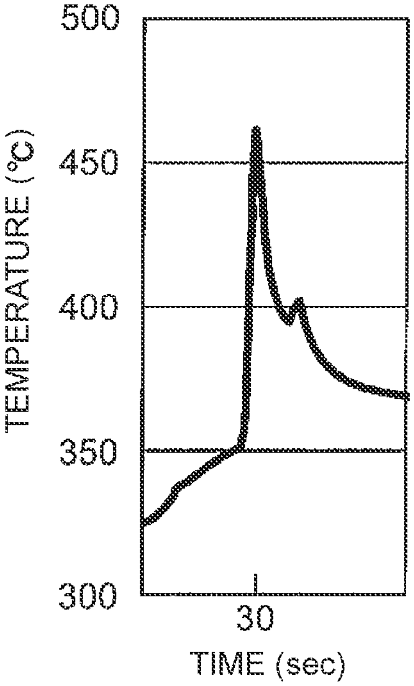
FIG. 14B is a graph showing a temperature change of an alloy ribbon in a lower end in the stacking direction of the stack in Example 1-2.

In this experiment, temperature changes of the alloy ribbons located at each position of the stack 10 in the stacking direction were measured after the amorphous alloy ribbon in the upper end of the stack 10 in the stacking direction was heated in the second heat treatment step. FIGS. 14A and 14B are graphs showing temperature changes of the alloy ribbons in the upper and lower ends of the stack 10 in the stacking direction in Example 1-2.

As shown in FIG. 14A, the temperature of the alloy ribbon in the upper end of the stack 10 in the stacking direction further increased after reaching the crystallization start temperature or higher and decreased thereafter. As shown in FIG. 14B, the temperature of the alloy ribbon in the lower end of the stack 10 in the stacking direction further increased after reaching the crystallization start temperature or higher later than the alloy ribbon in the upper end and decreased thereafter.

The average grain size of crystal grains was measured with a TEM in the alloy ribbons in the upper and lower ends of the stack in the stacking direction after the reaction in this experiment in order to check for precipitation of compound phases. The results are shown in Table 1 below.

TABLE 1

| | Alloy Ribbon in Upper End in Stacking Direction of Stack | Alloy Ribbon in Lower End in Stacking Direction of Stack |
|---|---|---|
| Average Grain Size of Crystal Grains (nm) | 23.7 | 22.8 |
| Precipitation of Compound Phases (—) | None | None |

The results in Table 1 show that, for both of the alloy ribbons in the upper and lower ends of the stack in the stacking direction after the reaction, the average grain size of the crystal grains was 25 nm or less, and there was no precipitation of compound phases.

2. Examples in which the End in the Planar Direction of the Stack is Heated in the Second Heat Treatment Step Examples of the method for producing an alloy ribbon in which the end in the planar direction of the stack is heated in the second heat treatment step will be described.

Example 2-1

A simulation of the above method for producing an alloy ribbon is carried out using computer aided engineering (CAE). This will be specifically described below.

Model of Computation for Stack of Amorphous Alloy Ribbons

Figure 15:
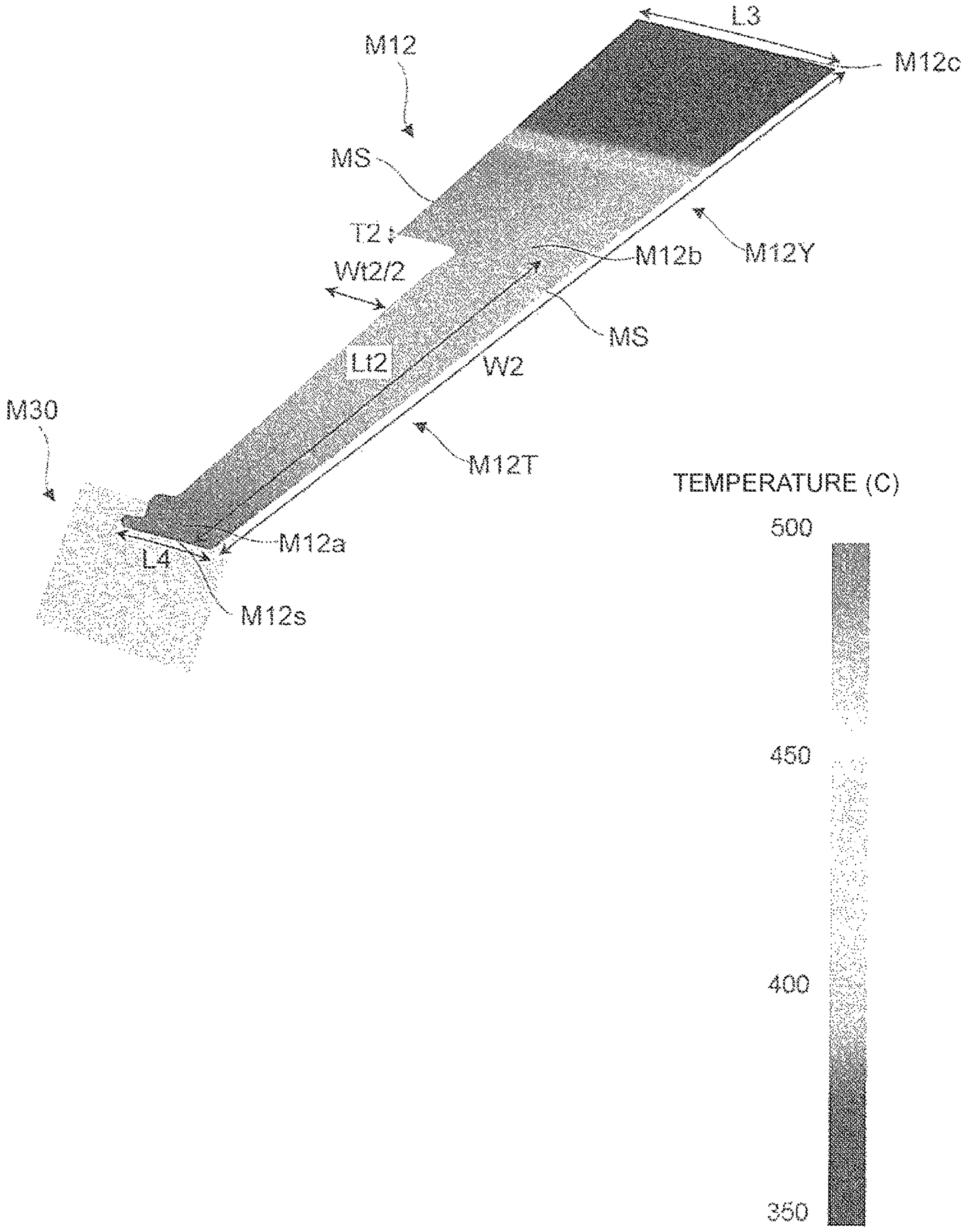
FIG. 15 is an image showing the temperatures at various positions in a model of computation for a stack 20 seconds after heating of an inner peripheral end in Example 2-1.

A model of computation M12 for a stack having the shape shown in FIG. 15 was created as a model of computation for a stack of amorphous alloy ribbons for use in this simulation. The model of computation M12 for the stack has the shape of a divided part of a single amorphous alloy ribbon of a stack to be used for stator cores, namely a part of a single amorphous alloy ribbon of the stack as divided by a plane of symmetry (corresponding to a plane of symmetry MS of the model of computation M12) located in a tooth portion (corresponding to a tooth portion M12T of the model of computation M12) and a back yoke portion (corresponding to a back yoke portion M12Y of the model of computation M12) of the amorphous alloy ribbon. The stack was modeled in view of heat transfer between this amorphous alloy ribbon and amorphous alloy ribbons located on both sides of this amorphous alloy ribbon in the stacking direction.

Parameters required for simulation for amorphous alloy ribbons were set as follows on the assumption that the model of computation M12 for the stack was a stack of amorphous alloy ribbons comprised of a common Fe group amorphous alloy.

Crystallization start temperature: 360° C., compound phase precipitation start temperature: 530° C., thermal conductivity: 10 W/mK, amount of heat released due to crystallization: 90 J/g, and heat transfer coefficient between the amorphous alloy ribbon and its adjacent amorphous alloy ribbons located on both sides in the stacking direction: 50 W/($m^2$K)

The size of each portion of the model of computation M12 for the stack was set as follows.

Thickness T2 of alloy ribbon: 0.025 mm, length L3 of a portion corresponding to a part of the outer periphery of the alloy ribbon: 7 mm, length L4 of a portion corresponding to a part of the inner periphery of the alloy ribbon: 3 mm, radial width W2: 35 mm, radial length Lt2 of the tooth portion M12T: 20 mm, and circumferential width Wt2 of a groove between the tooth portions M12T: 2 mm.

Simulation Using CAE

The simulation using CAE was carried out under the same conditions as those of Example 1-1.

In this simulation, the entire model of computation M12 for the stack was first soaked to 320° C. that is lower than the crystallization start temperature (first heat treatment step).

Next, a model M30 for a high temperature heat source soaked to 500° C., which is shown in FIG. 15, was placed in contact with an inner peripheral end face M12*s* in the planar direction of the model of computation M12 for the stack for 30 seconds to heat an inner peripheral end M12*a* in the planar direction of the model of computation M12 for the stack to a temperature range equal to or higher than the crystallization start temperature (second heat treatment step).

In this simulation, after the first heat treatment step, the ambient temperature of the model of computation M12 for the stack was held at 320° C. so that the entire model of computation M12 for the stack was kept in such a temperature range that the model of computation M12 for the stack could be crystallized by heating the inner peripheral end M12*a* in the planar direction of the model of computation M12 for the stack to a temperature range equal to or higher than the crystallization start temperature in the second heat treatment step. The above expression (1) according to the embodiment was also satisfied. Heat transfer between the model of computation M12 for the stack and the ambient temperature thereof was also included.

Analysis Results

Figure 16:
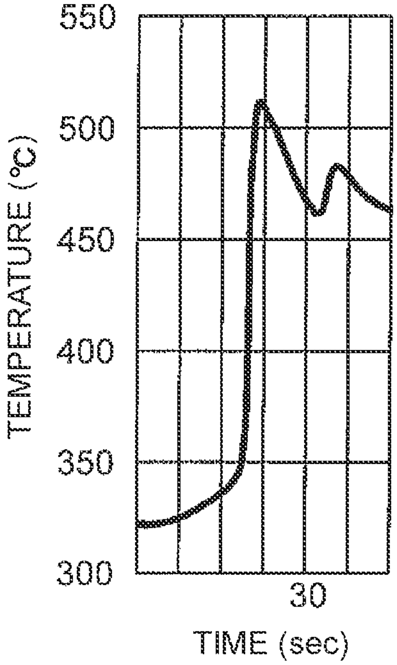
FIG. 16 is a graph showing a temperature change of a middle portion in the planar direction of the model of computation for the stack in Example 2-1.

In this simulation, temperature changes at each position in the model of computation M12 for the stack were analyzed after the inner peripheral end M12*a* in the planar direction of the model of computation M12 for the stack was heated to the temperature range equal to or higher than the crystallization start temperature in the second heat treatment step. FIG. 15 is an image showing the temperatures at each position in the model of computation for the stack 20 seconds after heating of the inner peripheral end in Example 2-1. FIG. 16 is a graph showing a temperature change of the middle portion in the planar direction of the model of computation for the stack in Example 2-1.

As shown in FIG. 15, after the inner peripheral end M12*a* in the planar direction of the model of computation M12 for the stack was heated, the inner peripheral end M12*a*, a middle portion M12*b*, and an outer peripheral end M12*c* in the planar direction of the model of computation M12 sequentially reached the crystallization start temperature or higher in this order. Most of the model of computation M12 for the stack reached the crystallization start temperature or higher 20 seconds after heating of the inner peripheral end M12*a*. Although not shown in the figure, the entire model of computation M12 reached the crystallization start temperature or higher 30 seconds after heating of the inner peripheral end M12*a*. In order to complete crystallization of each portion of the stack, it is necessary to hold each portion of the stack at a temperature equal to or higher than the crystallization start temperature for a certain time.

As shown in FIG. 16, the temperature of the middle portion M12*b* in the planar direction decreased after increasing to the crystallization start temperature or higher. It can be considered from the results shown in FIGS. 15 and 16 that the temperature of the inner peripheral end M12*a* in the planar direction decreased after increasing to the crystallization start temperature or higher earlier than the middle portion M12*b*, and the temperature of the outer peripheral end M12*c* in the planar direction decreased after increasing to the crystallization start temperature or higher later than the middle portion M12*b*.

Example 2-2

An experiment of the above method for producing an alloy ribbon was carried out. This will be specifically described below.

Stack of Amorphous Alloy Ribbons

A stack shaped to be used for stator cores was produced as a stack of amorphous alloy ribbons for use in this experiment.

The stack was produced by stacking alloy ribbons comprised of a Fe group amorphous alloy containing 84 atoms % or more of Fe. The thickness of the alloy ribbons, the number of alloy ribbons of the stack, and the size of each portion were as follows.

Thickness of the alloy ribbons: 0.025 mm, shape of the alloy ribbons: 50 mm by 50 mm (length by width) rectangle, and number of alloy ribbons of the stack: 500.

Experiment of Method for Producing an Alloy Ribbon

Figure 17A:
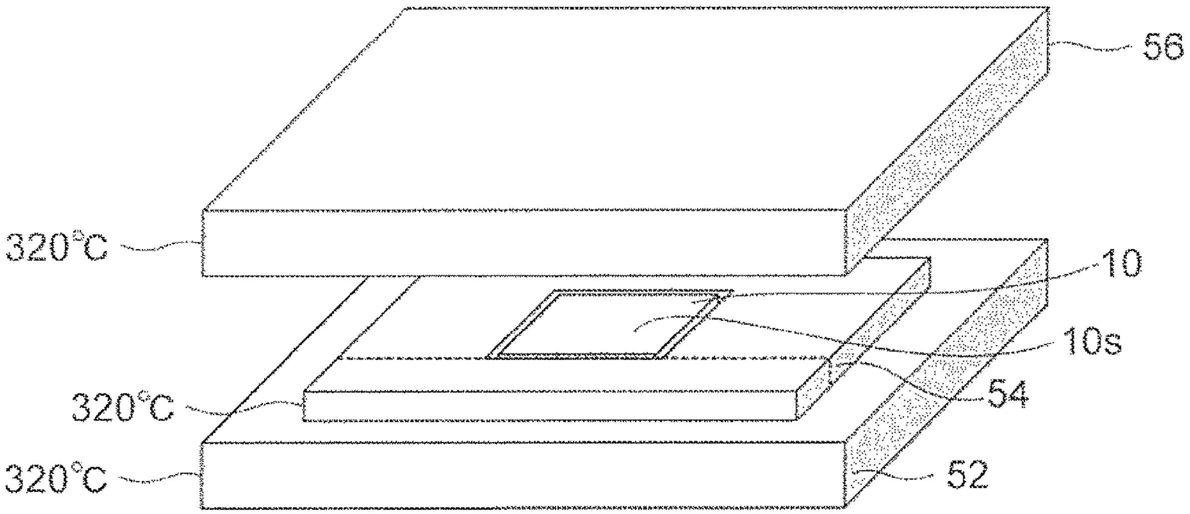
FIG. 17A is a schematic diagram illustrating an experiment of the method for producing an alloy ribbon in Example 2-2.
Figure 17B:
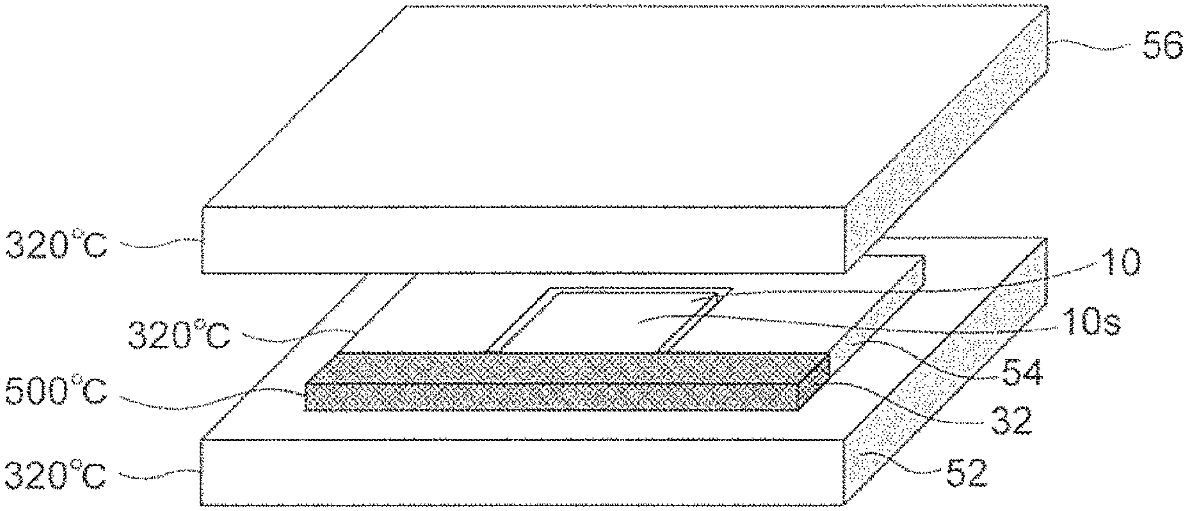
FIG. 17B is a schematic diagram illustrating the experiment of the method for producing an alloy ribbon in Example 2-2.

FIGS. 17A and 17B are schematic diagrams illustrating the experiment of the method for producing an alloy ribbon in Example 2-2.

In this experiment, as shown in FIG. 17A, the stack 10 was first placed on the upper surface of the lower die 52 soaked to 320° C. and surrounded by the anti-heat dissipation member 54 soaked to 320° C. such that the stack 10 was not in contact with the anti-heat dissipation member 54. The upper die 56 soaked to 320° C. was then placed on the stack 10, the anti-heat dissipation member 54, and the lower die 52. The stack 10 was held in this state for 10 minutes. The entire stack 10 was thus soaked to a temperature range lower than the crystallization start temperature (first heat treatment step).

Next, as shown in FIG. 17B, a part of the anti-heat dissipation member 54 which is located on one end face side in the planar direction of the stack 10 was removed, and a high temperature liquid 32 soaked to 500° C. was pressed against the one end face in the planar direction of the stack 10. The stack 10 was held in this state for 1 minute. One end in the planar direction of the stack 10 was thus heated to a temperature range equal to or higher than the crystallization start temperature (second heat treatment step).

In this experiment, after the first heat treatment step, the ambient temperature of the stack 10 was held by the lower die 52, the anti-heat dissipation member 54, and the upper die 56 so that the entire stack 10 was kept in such a temperature range that the stack 10 could be crystallized by heating the one end in the planar direction of the stack 10 to a temperature range equal to or higher than the crystallization start temperature in the second heat treatment step. The above expression (1) according to the embodiment was also satisfied.

Experimental Results

Figure 18:
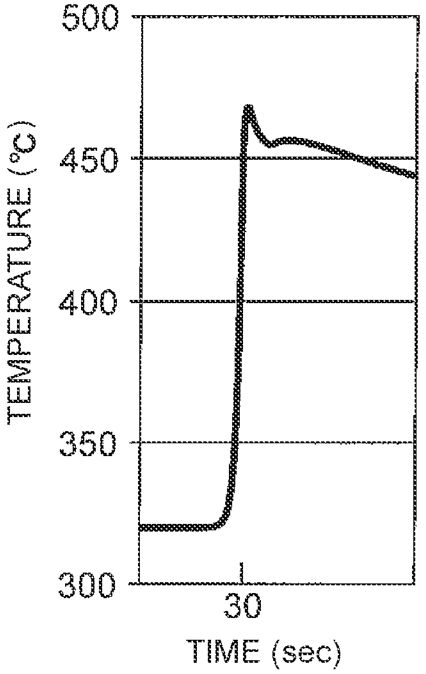
FIG. 18 is a graph showing a temperature change of a middle portion in the planar direction of an alloy ribbon of a stack in Example 2-2.

In this experiment, temperature changes at each position in the planar direction of the alloy ribbon of the stack 10 were measured after the one end in the planar direction of the stack 10 was heated in the second heat treatment step. FIG. 18 is a graph showing a temperature change of the middle portion in the planar direction of the alloy ribbon of the stack in Example 2-2.

As shown in FIG. 18, the temperature of the middle portion in the planar direction of the alloy ribbon of the stack further increased after reaching the crystallization start temperature or higher and decreased thereafter.

The average grain size of crystal grains was measured with a TEM in the middle portion in the planar direction of the alloy ribbon of the stack after the reaction in this experiment in order to check for precipitation of compound phases. The results are shown in Table 2 below.

TABLE 2

| | Middle Portion in Planar Direction of Alloy Ribbon of Stack |
|---|---|
| Average Grain Size of Crystal Grains (nm) | 25 or less |
| Precipitation of Compound Phases (—) | None |

The results in Table 2 show that, in the middle portion in the planar direction of the alloy ribbon of the stack after the reaction, the average grain size of the crystal grains was 25 nm or less, and there was no precipitation of compound phases.

3. Reference Example in which the Amount of Heat Required for the Crystallization Reaction is Applied by a Soaking Process.

For reference in the embodiment, a reference example of the method for producing an alloy ribbon will be described in which the amount of heat required for crystallization of the stack is applied by a soaking process.

Figure 19A:
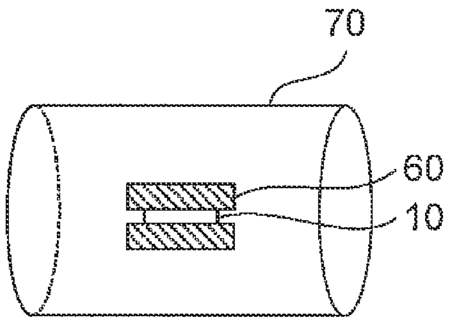
FIG. 19A is a schematic process diagram illustrating a reference example of the method for producing an alloy ribbon.
Figure 19B:
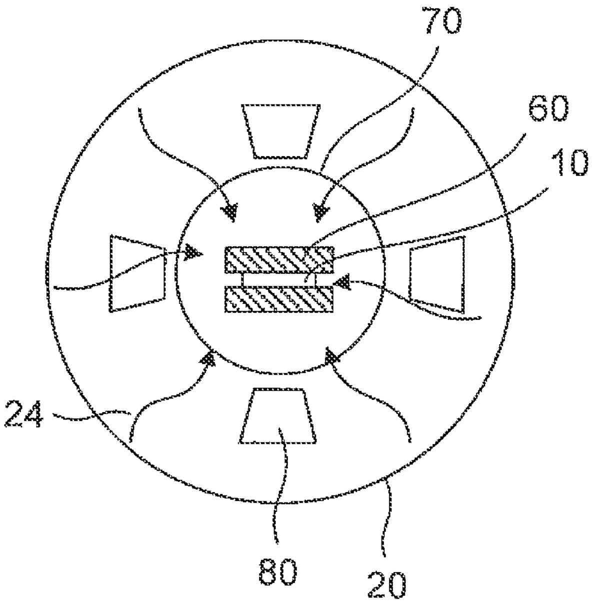
FIG. 19B is a schematic process diagram illustrating the reference example of the method for producing an alloy ribbon.

FIGS. 19A and 19B are schematic process diagrams illustrating the reference example of the method for producing an alloy ribbon. FIG. 19B shows a cross section of a glass tube shown in FIG. 19A.

In the reference example, as shown in FIG. 19A, a stack 10 of three amorphous alloy ribbons 2 (shape: 10 mm by 30 mm (length by width) rectangle, thickness: 0.016 mm) was first prepared. The amorphous alloy ribbons 2 are comprised of a Fe group amorphous alloy containing 84 atoms % or more of Fe. The stack 10 thus prepared was sandwiched between carbon plates 60 and placed in a glass tube 70.

Next, as shown in FIG. 19B, the glass tube 70 was placed in a heating furnace 20 having Au plating 24 on its inner wall surface, and with an infrared lamp 80, the stack 10 was uniformly heated using infrared rays reflected from the Au plating 24. Specifically, after the heating furnace 20 was heated to 400° C. equal to or higher than the crystallization start temperature at 20° C./min and was held at 400° C. for 10 minutes. The stack 10 was uniformly heated in this manner.

Figure 20:
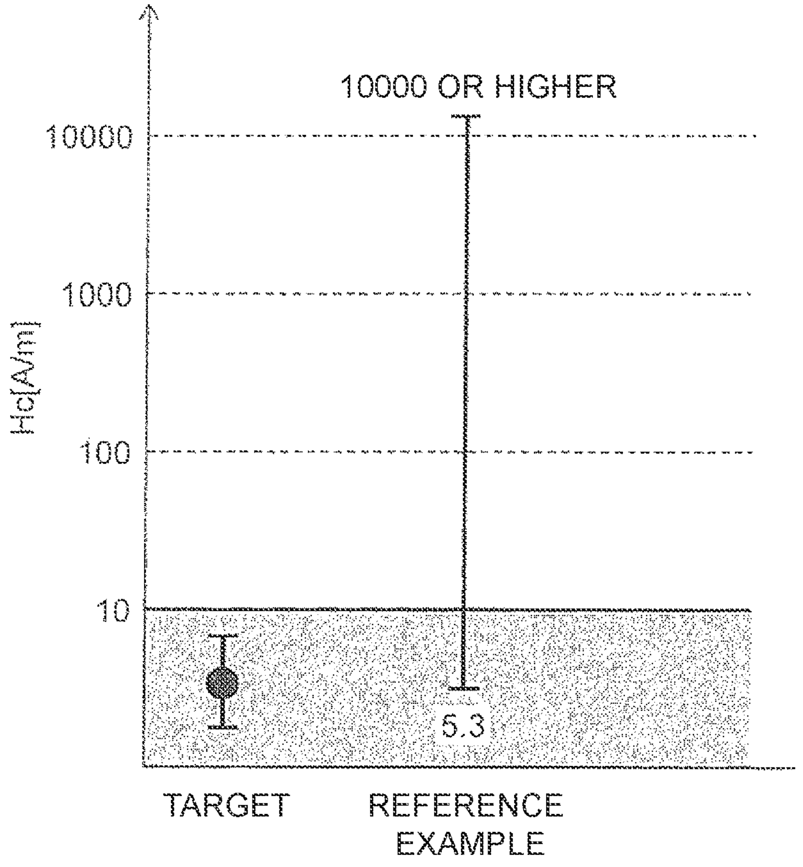
FIG. 20 is a graph showing the range of coercivity Hc measured in each alloy ribbon of a stack of the reference example shown in FIGS. 19A and 19B.

FIG. 20 is a graph showing the range of coercivity Hc measured in each alloy ribbon of the stack of the reference example shown in FIGS. 19A and 19B. FIG. 20 also shows a target range of coercivity Hc of the alloy ribbons of the stack.

As shown in FIG. 20, the upper limit of the range of coercivity Hc of the reference example is 10,000 A/m or higher, which is significantly higher than the target range of 10 A/m or less. It is considered from the results of FIG. 20 that, in the reference example, grain coarsening occurs due to heat accumulation, and therefore the temperature becomes higher and precipitation also occurred.

Although the embodiment of the method for producing an alloy ribbon according to the disclosure is described above in detail, the disclosure is not limited to the above embodiment, and various design changes can be made without departing from the spirit and scope of the disclosure described in the claims.

What is claimed is:

1. A method for crystallizing a stack of a plurality of alloy ribbons, comprising:

a preparation step of preparing a stack of a plurality of amorphous alloy ribbons;

a first heat treatment step of heating the stack to a first temperature range lower than a crystallization start temperature of the amorphous alloy ribbons; and a second heat treatment step of heating an end of the stack in a stacking direction by a heat source to a second temperature range equal to or higher than the crystallization start temperature after the first heat treatment step, wherein:

after the first heat treatment step, an ambient temperature of the stack is held so that the stack is kept in a temperature range that allows the stack to be crystallized by heating the end of the stack to the second temperature range in the second heat treatment step;

in the second heat treatment step, a first amorphous alloy ribbon at the end of the stack is heated to the second temperature range while the stack other than the first amorphous alloy ribbon is kept in a temperature range lower than the crystallization start temperature, and heat released due to crystallization repeatedly occurs so as to propagate from the first amorphous alloy ribbon at the end of the stack to an amorphous alloy ribbon located at an opposite end of the stack from the first amorphous alloy ribbon, and the heat released due to crystallization is dissipated from an outer surface of the opposite end of the stack by a heat dissipating member.

2. The method according to claim 1, wherein in the second heat treatment step, the first amorphous alloy ribbon is heated with the stack being pressed in the stacking direction.

3. The method according to claim 1, wherein the heat dissipating member is in contact with the opposite end of the stack.

4. The method according to claim 1, wherein the heat source is a radiation heating lamp, a copper plate, a salt bath, or a heater.

5. The method according to claim 1, wherein the crystallization start temperature is 360° C.

* * * * *